US009817760B2

(12) United States Patent
Robinson et al.

(10) Patent No.: US 9,817,760 B2
(45) Date of Patent: Nov. 14, 2017

(54) SELF-HEALING COARSE-GRAINED SNOOP FILTER

(71) Applicant: QUALCOMM Incorporated, San Diego, CA (US)

(72) Inventors: Eric Francis Robinson, Raleigh, NC (US); Khary Jason Alexander, Austin, TX (US); Zeid Hartuon Samoail, Austin, TX (US); Benjamin Charles Michelson, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 15/063,259

(22) Filed: Mar. 7, 2016

(65) Prior Publication Data

US 2017/0255557 A1 Sep. 7, 2017

(51) Int. Cl.
*G06F 12/08* (2016.01)
*G06F 12/0815* (2016.01)
(Continued)

(52) U.S. Cl.
CPC ........ *G06F 12/0815* (2013.01); *G06F 12/084* (2013.01); *G06F 12/0811* (2013.01); *G06F 12/0831* (2013.01); *G06F 2212/1024* (2013.01); *G06F 2212/251* (2013.01); *G06F 2212/621* (2013.01)

(58) Field of Classification Search
CPC ............. G06F 12/0815; G06F 12/0811; G06F 12/084; G06F 2212/1024; G06F 2212/251; G06F 2212/621
See application file for complete search history.

(56) References Cited

U.S. PATENT DOCUMENTS 7,325,102 B1 * 1/2008 Cypher ............... G06F 12/0831
711/146
8,209,489 B2 6/2012 Guthrie et al.
(Continued)

OTHER PUBLICATIONS

Bloom B.H. "Space/Time Trade-Offs in Hash Coding with Allowable Errors", ACM, New York, NY, US, Jul. 1, 1970 (Jul. 1, 1970), vol. 13 (7), pp. 422-426, XP002490170, ISSN: 0001-0782.
(Continued)

*Primary Examiner* — Reginald Bragdon
*Assistant Examiner* — Edward Wang
(74) *Attorney, Agent, or Firm* — Muncy, Geissler, Olds & Lowe, P.C.

(57) ABSTRACT

The disclosure relates to filtering snoops in coherent multi-processor systems. For example, in response to a request to update a target memory location at a Level-2 (L2) cache shared among multiple local processing units each having a Level-1 (L1) cache, a lookup based on the target memory location may be performed in a snoop filter that tracks entries in the L1 caches. If the lookup misses the snoop filter and the snoop filter lacks space to store a new entry, a victim entry to evict from the snoop filter may be selected and a request to invalidate every cache line that maps to the victim entry may be sent to at least one of the processing units with one or more cache lines that map to the victim entry. The victim entry may then be replaced in the snoop filter with the new entry corresponding to the target memory location.

33 Claims, 12 Drawing Sheets

(51) Int. Cl.
G06F 12/0811 (2016.01)
G06F 12/084 (2016.01)
G06F 12/0831 (2016.01)

(56) References Cited

U.S. PATENT DOCUMENTS

| | | | |
|---|---|---|---|
| 8,856,448 B2 | 10/2014 | Morrow et al. | |
| 9,058,272 B1* | 6/2015 | O'Bleness | G06F 12/0831 |
| 9,086,973 B2 | 7/2015 | Vorbach | |
| 2014/0052905 A1 | 2/2014 | Lih et al. | |
| 2015/0199290 A1 | 7/2015 | Mathewson et al. | |
| 2016/0062890 A1* | 3/2016 | Salisbury | G06F 12/0815 |
| | | | 711/146 |

OTHER PUBLICATIONS

Moshovos A., "RegionScout: Exploiting Coarse Grain Sharing in Snoop-Based Coherence," 32nd International Symposium on Computer Architecture, 2005, pp. 234-245.
Zebchuk J., et al., "A Tagless Coherence Directory", ACM, MICRO '09, New York, Dec. 16, 2009, pp. 423-434.
International Search Report and Written Opinion—PCT/US2017/017168—ISA/EPO—dated May 31, 2017.

\* cited by examiner

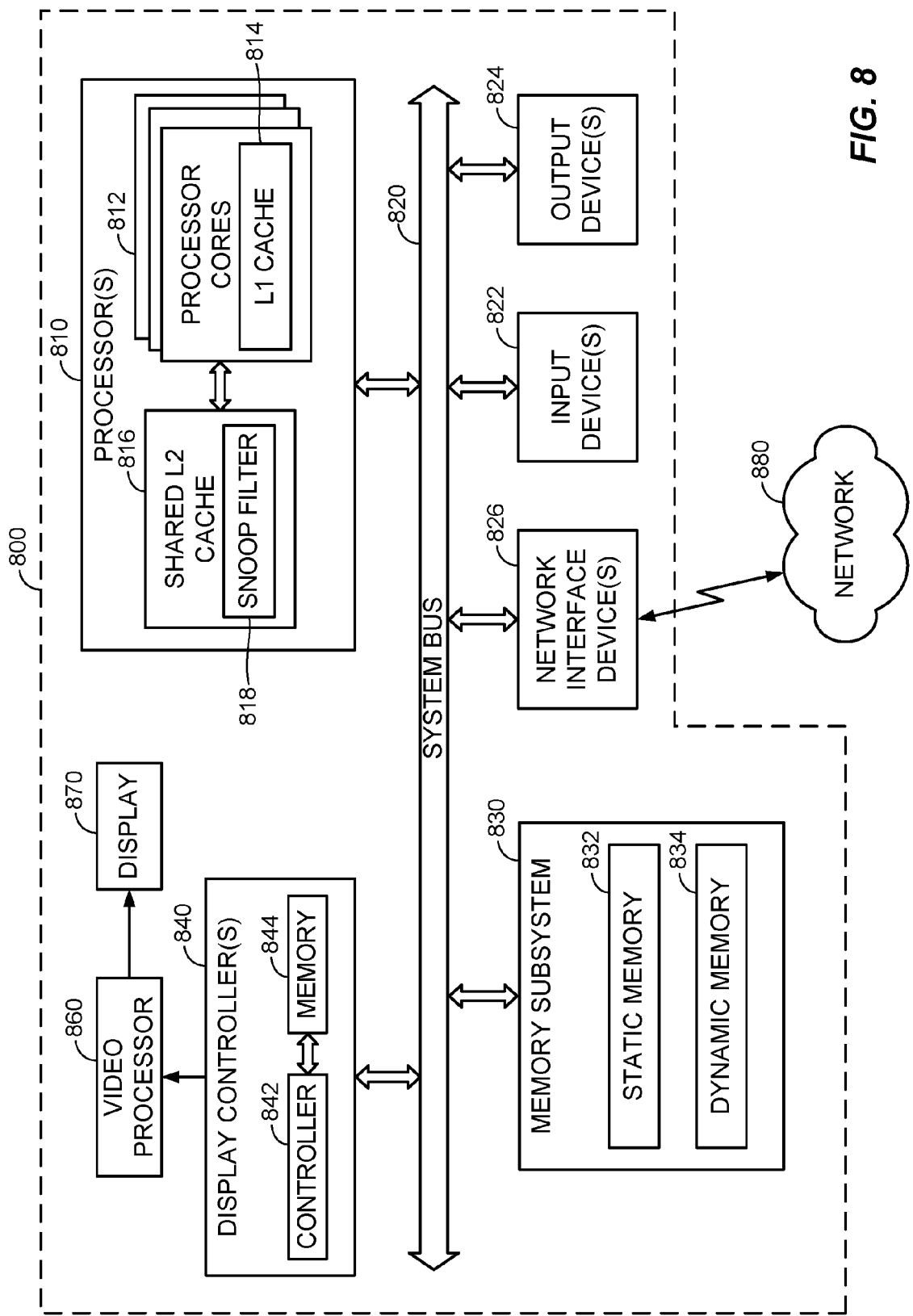

SELF-HEALING COARSE-GRAINED SNOOP FILTER

TECHNICAL FIELD

The various aspects and embodiments described herein generally relate to coherent multiprocessor systems, and in particular, to a self-healing coarse-grained snoop filter that can filter snoops to one or more processors in a multiprocessor system.

BACKGROUND

A typical multiprocessor integrated circuit (i.e., chip) utilizes multiple processor cores that are interconnected using an interconnection bus. In general, one or more caches support each processor core, where each cache typically stores data files that are transferred between a main memory and the caches in blocks that have a fixed size and are typically called "cache lines." In conventional directory-based approaches, each cache includes a directory that contains all the addresses that are associated with the data files cached therein. The data cached at each processor core can be shared among all other processor cores on the interconnection bus. Accordingly, a multiprocessor system can potentially have many copies of the same data, one copy in the main memory, which may be on-chip or off-chip, and one copy in each processor core cache. Moreover, because each processor core can share the data in the local cache with any other processor core on the interconnection bus, a fundamental issue in modern multiprocessor systems is how to ensure that all copies of a given memory location are consistent or coherent as observed by all the processors when any processor(s) desire to update that memory location. In general, the interconnection bus includes hardware mechanisms that are used to handle all the coherency traffic among the various processor cores and caches to maintain cache coherency.

Although other variations are possible, a common method to achieve cache coherency is to have all caches that contain copies of the target memory location stop using the current copy of the target location, which may be achieved through invalidating the cache line that contains the target memory location. Once all cached copies of the target memory location have been invalidated, the processor that desires to update the target memory location is then free to do so. Any other processor that subsequently accesses that memory location will then obtain the updated value, either from the processor that made the update or from the main memory. One mechanism to maintain cache coherency in a multiprocessor system utilizes "snooping," whereby a processor core that needs a particular cache line first looks in a local cache. If the processor core finds the cache line in the local cache, a cache "hit" has occurred. However, if the processor core does not find the cache line in the local cache, a cache "miss" has occurred, in which case the processor may "snoop" the caches associated with the other processors to determine whether any other caches have the requested cache line. If the requested cache line is located in the cache associated with another processor core, the cache associated with the other processor core can "intervene" to provide the cache line to the requesting processor core such that the requesting processor core does not have to access the data from main memory.

Snooping techniques may generally work well in the event that only two processor cores and associated caches are attached to the interconnection bus. For example, if the first processor core requests a cache line and the cache associated with the second processor core contains the requested cache line, then the cache associated with the second processor core will provide the requested cache line to the first processor core. Otherwise, the cache associated with the first processor core will access the requested cache line from main memory. However, as the interconnection bus supports more and more processor cores that may have the requested data in a local cache, more complex arbitration mechanisms are needed to decide which cache is to provide the requested cache line to the requesting processor core. For example, one arbitration mechanism may include a snoop filter implemented on the interconnection buss, wherein the snoop filter maintains entries that represent the cache lines that all the processor core caches on the interconnection bus own. Accordingly, rather than broadcasting the snoop request to all processor caches on the interconnection bus, the snoop filter may direct the interconnection bus to snoop only the processor caches that could possibly have a copy of the data. Accordingly, in a "snoopy" coherency protocol, when a modifying processor desires to modify a target memory location, the modifying processor may be called the "master" and the other processors may be called "snoopers." Every other processor that has a coherent cache is notified that the modifying processor intends to modify the target memory location such that the snoopers can take appropriate action upon seeing the request from the master.

Although snoopy protocols generally scale better than directory-based protocols, snoopy protocols nonetheless have a scaling weakness, whereby increases in the number of active processors results in a corresponding increase in the amount of snoop traffic that each active processor receives. Accordingly, snoop filtering generally has an overarching goal to reduce the number of unnecessary snoops as much as possible without introducing area or latency costs or diminishing the ability to filter snoops as time progresses due to accumulated false positives.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, a snoop filter having a coarse-grained implementation may enable coherency in a multiprocessor system, wherein the snoop filter may advantageously have a low area and a low latency in addition to self-healing (or self-correcting) aspects such that the snoop filter does not generate substantial false positives and does not suffer a diminished ability to filter snoops as time progresses. As such, the snoop filter may have the advantages associated with a coarse-grained snoop filter with respect to low area and low latency while also having the manageability advantages associated with a fine-grained snoop filter, whereby the ability to filter snoops does not diminish and false positives are not accumulated over time, which may serve the overarching goal to reduce unnecessary snoops as much as possible.

For example, according to various aspects, a method for filtering snoops in a coherent multiprocessor system as described herein may comprise receiving a request to update a target memory location at a Level-2 (L2) cache shared among multiple local processing units that each have a Level-1 (L1) cache and performing a lookup based on the target memory location in a snoop filter that tracks entries in the L1 cache associated with each local processing unit. In response to the lookup missing the snoop filter and the snoop filter lacking available space to store a new entry that corresponds to the target memory location, the method may further comprise selecting a victim entry to evict from the snoop filter (e.g., entry in the snoop filter that was least-recently accessed, least-recently established, a least-frequently accessed entry selected from among a plurality of least-recently accessed entries, one or more entries that remote snoops frequently hit and that the multiple local processing units have not accessed recently, a random entry, etc.). The method may further comprise sending a request to invalidate every cache line that maps to the selected victim entry to at least one of the multiple processing units that has one or more cache lines that map to the selected victim entry in the L1 cache associated therewith, and replacing the selected victim entry in the snoop filter with the new entry that corresponds to the target memory location. In various embodiments, the snoop filter and the L1 cache at each local processing unit may be flushed in response to the lookup missing the snoop filter and the snoop filter lacking available space to store the new entry that corresponds to the target memory location, in which case the selected victim entry to evict from the snoop filter may comprise every entry in the snoop filter and the request sent to each L1 cache may cause the entire L1 cache to be flushed. Alternatively, in response to the lookup based on the target memory location missing the snoop filter and the snoop filter having the available space to store the new entry, the method may comprise installing the new entry in the snoop filter. However, in the event that the lookup hits the snoop filter, at least one processing unit that has one or more cache lines that map to the target memory location may be identified among the multiple local processing units, a local snoop may be forwarded to the identified at least one processing unit, and one or more metrics that are used to select the victim entry to be evicted upon the snoop filter lacking the available space to store the new entry may be updated accordingly.

According to various aspects, in the event that the lookup misses the snoop filter and the snoop filter lacks available space to store the new entry that corresponds to the target memory location, the method may further comprise establishing the new entry in a temporary overflow area and moving the new entry from the temporary overflow area into the snoop filter to replace the selected victim entry upon receiving an acknowledgement from the at least one processing unit indicating that every cache line that maps to the selected victim entry has been invalidated in the L1 cache associated therewith. Furthermore, in response to receiving one or more remote snoops indicating that a remote master has requested permission to modify a memory location after the new entry is established in the temporary overflow area and before the acknowledgement is received, the method may comprise forwarding the remote snoop to one or more of the multiple local processing units in response to the remote snoop hitting the selected victim entry or the new entry. Alternatively, according to various aspects, the method may comprise temporarily disabling the snoop filter prior to receiving the acknowledgement, in which case a remote snoop that is received while the snoop filter is disabled may be forwarded to the L1 cache at each local processing unit.

According to various aspects, a coherent multiprocessor system may therefore comprise multiple local processing units that each have an L1 cache, an L2 cache shared among the multiple local processing units, wherein the L2 cache includes a snoop filter configured to track entries in the L1 cache associated with each local processing unit, and a processor configured to receive a request to update a target memory location at the L2 cache, perform a lookup in the snoop filter based on the target memory location, select a victim entry to evict from the snoop filter in response to the lookup missing the snoop filter and the snoop filter lacking available space to store a new entry that corresponds to the target memory location, send a request to invalidate every cache line that maps to the selected victim entry to at least one of the multiple processing units that has one or more cache lines that map to the selected victim entry in the L1 cache associated therewith, and replace the selected victim entry in the snoop filter with the new entry that corresponds to the target memory location.

According to various aspects, an apparatus as described herein may comprise means for receiving a request to update a target memory location at a non-inclusive L2 cache shared among multiple local processing units that each have a L1 cache, means for performing a lookup based on the target memory location in a snoop filter that tracks entries in the L1 cache associated with each local processing unit, means for selecting a victim entry to evict from the snoop filter in response to the lookup missing the snoop filter and the snoop filter lacking available space to store a new entry that corresponds to the target memory location, means for sending a request to invalidate every cache line that maps to the selected victim entry to at least one of the multiple processing units that has one or more cache lines that map to the selected victim entry in the L1 cache associated therewith, and means for replacing the selected victim entry in the snoop filter with the new entry that corresponds to the target memory location.

According to various aspects, a computer-readable medium as described herein may store computer-executable instructions configured to cause one or more processors to receive a request to update a target memory location at a non-inclusive L2 cache shared among multiple local processing units that each have an L1 cache, perform a lookup based on the target memory location in a snoop filter that tracks entries in the L1 cache associated with each local processing unit, select a victim entry to evict from the snoop filter in response to the lookup missing the snoop filter and the snoop filter lacking available space to store a new entry that corresponds to the target memory location, send a request to invalidate every cache line that maps to the selected victim entry to at least one of the multiple processing units that has one or more cache lines that map to the selected victim entry in the L1 cache associated therewith, and replace the selected victim entry in the snoop filter with the new entry that corresponds to the target memory location.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which:

FIG. 8 illustrates an exemplary multiprocessor system that may implement the self-healing coarse-grained snoop filter described herein, according to various aspects.

DETAILED DESCRIPTION

Figure 1:
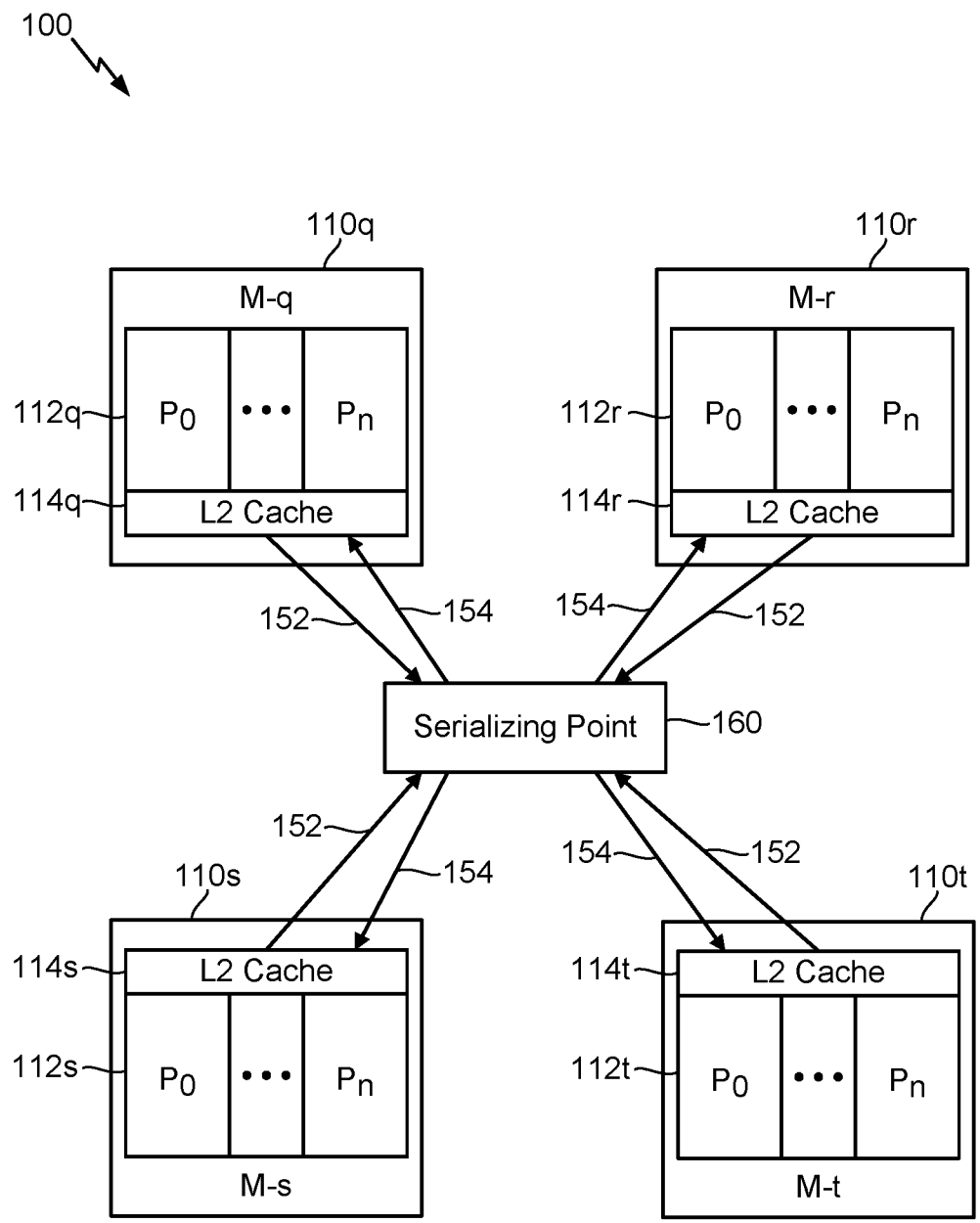
FIG. 1 illustrates an exemplary multiprocessor architecture in which a serialization point may handle cache coherency traffic, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of non-transitory computer readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As described in further detail herein, various aspects and embodiments disclosed herein generally relate to coherency in multiprocessor systems, and more particularly, to a coarse-grained snoop filter that may advantageously have a low area and a low latency in addition to self-healing (or self-correcting) aspects such that the coarse-grained snoop filter does not generate substantial false positives and does not suffer a diminished ability to filter snoops as time progresses.

In particular, as general background, a typical "snoopy" coherency protocol involves notifying each processor with a coherent cache when another processor has requested permission to modify a target memory location (e.g., because the processor intends to modify the target memory location or might modify the target memory location in the future such that a unique copy is requested speculatively in preparation to potentially write the line in the future). In that context, the processor requesting the permission to modify the target memory location is called the "master" and the other processors are called "snoopers." Upon seeing the request to modify the target memory location from the master, the snoopers take appropriate action based on a lookup operation. For example, in response to the lookup operation resulting in a cache miss, no further action is needed. Alternatively, in the event that the lookup operation results in a clean cache hit, the snooper may invalidate the corresponding local copy. However, in response to finding a modified hit, the snooper usually either (i) invalidates the line, or (ii) instructs the master to wait while the snooper updates the memory with the modified information prior to invalidating the cache line, wherein the particular action that the snooper takes in response to a modified cache hit may depend on the specifics associated with the coherency protocol that has been implemented. The other possibility is that the snooper may be unable to perform the cache lookup and/or invalidation, in which case the snooper will typically respond with a "retry" that may cause the master to resend the request. Alternatively, an interconnect may act as a proxy for the master. In either case, the snooper will need to see the request again such that the snooper can perform a lookup and invalidate the local copy prior to the master completing a write operation to update the target memory location.

Although snoopy protocols scale better than directory-based protocols, snoopy protocols tend to suffer from a scaling weakness that may be addressed in the various aspects and embodiments described herein. Specifically, as the active processors in a particular multiprocessor system increase in number, a corresponding increase in snoop traffic received at each active processor increases. For example, supposing that every ten (10) instructions includes one (1) store instruction and further supposing that a processor maintains a one (1) instruction per cycle (IPC) throughput, the multiprocessor system would experience two (2) stores in every 10 cycles. Moreover, each processor would potentially receive a snoop request every 10 cycles (corresponding to the stores that the other processor performs). In the event that the processors increased in number to 10, the multiprocessor system would experience 10 stores in 10 cycles, resulting in each snooper receiving nine (9) snoops in 10 cycles. With continued scaling, in a multiprocessor system having twenty (20) processors, each snooper would need to process up to ~2 snoops per cycle, and so on. Furthermore, although store instructions can be gathered into groups that perform a single write and therefore perform a single snoop per group, the scaling problem remains. At some point, the multiprocessor system could generate more snoop traffic than each processor has the ability to handle without impacting throughput associated with non-snoop operations. Accordingly, as modern multiprocessor systems are supporting more and more processors that can each have multiple cores (e.g., dual-core processors, quad-core processors, etc.), there is an ever-increasing need to reduce unnecessary snoop traffic as much as possible.

Referring to FIG. 1, an exemplary multiprocessor architecture 100 is illustrated in which a serialization point 160 may handle cache coherency traffic. In the example architecture 100 shown in FIG. 1, the serialization point 160 is connected to several attached processors 110$q$, 110$r$, 110$s$, 110$t$, wherein the processors 110$q$-110$t$ each respectively have multiple processing units 112$q$, 112$r$, 112$s$, 112$t$ with a local Level-1 (L1) cache (not shown). In addition, the processors 110$q$-110$t$ each have a respective local Level-2 (L2) cache 114$q$, 114$r$, 114$s$, 114$t$ shared among the respective multiple processing units 112$q$-112$t$. However, those skilled in the art will appreciate that the particular arrangement illustrated in FIG. 1 is exemplary only, whereby the multiprocessor architecture 100 may include any suitable arrangement that includes multiple central processing units (CPUs) that share one or more caches (e.g., a single processor with two or more processor cores, multiple processors that include one or more processors with a single core, etc.). Furthermore, as used in the following description, whether a particular cache is referred to as "lower-level" or "higher-level" may generally depend on closeness to a processor, wherein a "higher-level" cache may be defined as closer to the processor relative to a "lower-level" cache farther away from the processor. For example, in the architecture 100 shown in FIG. 1, the L2 caches 114$q$-114$t$ are farther away from the processing units 112$q$-112$t$ relative to the L1 caches associated with each individual processing unit 112, whereby the L2 caches 114$q$-114$t$ may be referred to as "lower-level" relative to the L1 caches and the L1 caches may be referred to as "higher-level" relative to the L2 caches 114$q$-114$t$. Furthermore, if the architecture 100 were to include one or more Level-3 (L3) caches, the L3 caches would be "lower-level" relative to the L2 caches 114$q$-114$t$ and the L2 caches 114$q$-114$t$ would be "higher-level" relative to the L3 cache(s).

According to various aspects, in the architecture 100 shown in FIG. 1, each cache coherent request (e.g., write) that leaves a master goes to the serialization point 160. Cache coherency protocols commonly use the first-come, first-served concept, whereby the order in which inbound snoops arrive at one snooper is the same as the order in which snoops arrive at all snoopers. As such, the serialization point 160 may be a first-in first-out (FIFO) queue or any other suitable mechanism that can resolve substantially simultaneous requests from multiple masters. From the serialization point 160, the request may be broadcasted to all snoopers. The following description will provide an example based on a request from processor 110$q$, labelled M-q and referred to as such hereinafter, whereby the requesting processor M-q 110 would be the master and the snoopers would be processors 110$r$, 110$s$, 110$t$, labelled in FIG. 1 as M-r, M-s, M-t and referred to hereinafter as such. Furthermore, note that the master request bandwidth is 4× the snoop bandwidth at the snoopers, as each inbound arrow 152 shown in FIG. 1 that comes into the serialization point 160 represents a unique request per-master per-cycle. However, the outbound arrows 154 (also from the serialization point 160 perspective) are logically shared because all snoopers receive the same snoop.

Accordingly, a mechanism to help the required snoop bandwidth (corresponding to the outbound arrows 154) keep up with the potential request bandwidth (corresponding to the inbound arrows 152) is needed. For example, assuming that the serialization point 160 has the ability to know whether the request from M-q 110$q$ is accessing a memory location not cached at M-r 110$r$, M-s 110$s$, or M-t 110$t$, then the serialization point 160 can avoid sending a snoop based on the request from M-q 110$q$. Moreover, the serialization point 160 could instead send a snoop for another request, and as such, potentially handle two requests in the same cycle (i.e., one where the snoop is avoided and one where a snoop is sent out). Among other things, avoiding the snoop and creating the potential to handle more than one request in the same cycle helps the snoop bandwidth (outbound arrows 154) more closely match the request bandwidth (inbound arrows 152). As such, the term "snoop filtering" as used herein generally refers to the concept whereby knowledge about the cache contents at the snoopers is employed to avoid sending unnecessary snoops.

There are several ways in which snoop filtering can be implemented, each having certain advantages and drawbacks. A "fine-grained snoop filter" (FGSF) generally tracks the contents in snooper caches at a cache line granularity. Depending on the particular implementation, a FGSF either (i) knows precisely what is contained in the cache that the FGSF is tracking, or (ii) knows what may be contained in the tracked cache. The precise FGSF is generally considered to be the snoop filtering gold standard in that the precise FGSF knows exactly when to send and when not to send a snoop to the target snooper. In that sense, the precise FGSF can be said to have substantially no false positives because the precise FGSF duplicates the cache tags in the snooper and knows exactly what the cache contains (or may contain). However, the precision that results in no false positive carries a high overhead cost based on the communication and energy needed to manage the precise FGSF (e.g., the snooper must notify the FGSF about any clean evictions, not just modified evictions). In area terms, the precise FGSF is also expensive due to the duplicate tags. Although there are less-precise FGSF implementations that utilize inclusive-style duplicate tags rather than full duplicate tags and therefore have less snooper communication that needs to be managed, the decreased precision in the duplicate tags results in at least some false positives. Consequently, in the less-precise FGSF implementations, more snoops may be sent to the snooper than actually need to be sent. Furthermore, the less-precise FGSF has a similar high area and power cost as the precise FGSF because the less-precise FGSF still tracks snooper contents on a cache line basis, although the less-precise FGSF may have less communication overhead than the precise FGSF.

Additional known filtering techniques utilize a "Bloom" filter, which can have a fine-grained implementation in that Bloom filters "track" snooper cache contents on a cache line granularity-level. In a similar respect as the fine-grained filter types already described above, Bloom filters also have no false negatives, which would occur if the snoop filter were to indicate that a particular request did not need a snoop when in fact the snoop really was needed, thus leading to lost cache coherency. However, because Bloom filters use several address hashes to track the snooper cache contents, Bloom filters can generate false positives, which occur when the filter indicates that a snoop is needed for a particular request when in fact the snoop was not needed. However, false positives are somewhat tolerable (or at least more tolerable than false negatives) because false positives do not affect cache coherency, although false positives may impact performance and energy use. Moreover, managing Bloom filters to clean up lines that are evicted from the snoopers becomes problematic, as Bloom filters can saturate and lose the ability to clean up false positives that accumulate over time (although a saturated Bloom filter may retain the ability to perform filtering functions). Although Bloom filters generally require less area than the FGSF, Bloom filters are less precise and more problematic to manage over time due to accumulated false positives, especially due to the address aliasing related to the hashing employed to track the snooper cache contents. Moreover, the area and communication overhead associated with a Bloom filter increases as more precision is desired.

Perhaps the least expensive filter (at least in terms of silicon area) is a coarse-grained snoop filter (CGSF). In general, a CGSF tracks an address range, such as a 1 GB region, a 16 KB page, or another suitable range. In the event that a snooper ever accesses any address within the tracked range, a snoop will be sent out to that snooper when any subsequent access falling within that range occurs. The CGSF is very small and works very well when each master operates within an address range (or ranges) that are within the CGSF granularity. In general, once a master begins to operate within a second range, there is no more filtering possible for that master because the CGSF only tracks the existence of a single range for that master. Consequently, once a master begins to use addresses that fall outside the range that the CGSF has the ability to track, all snoops must be sent to that master because the CGSF can no longer eliminate "false negatives" and coherency is at risk if that master does not observe all snoops. It should be noted that although this description of a CGSF is for only a single range per master, a CGSF could be implemented to support multiple ranges per master, such as 16. Nonetheless, the key limitation remains, in that the CGSF will reach a (saturation) limit in the ability to track the address ranges that have been cached by that master unless the ranges are organized such that the number of ranges and size per range is sufficient to cover the entire address space. As such, once a CGSF saturates, the CGSF is effectively disabled until all caches have been flushed. One approach to solve the above-mentioned problems with a CGSF may be to expand the address range that the CGSF can track to some number greater than one per-master. However, this approach does not scale well, as the area required to track the additional address range(s) quickly grows and the latency to perform the filter lookup increases as either the masters or the ranges grow in number. A further consideration is that increasing the size of the region that a particular range covers increases the number of false positives, which results in less effective filtering of snoop traffic.

Referring again to FIG. 1, assuming that the serialization point 160 has some snoop filter implemented therein (e.g., a FGSF, a CGSF, a Bloom filter, etc.), the snoop filter would only cover the addresses that each master cluster M-q 110$q$, M-r 110$r$, M-s 110$s$, M-t 110$t$ accesses. Once the serialization point 160 decides to send a snoop to the L2 cache 114$q$ at M-q 110$q$ for address-A, the L2 cache 114$q$ must then decide whether to forward the snoop to (i) each attached processing unit 112$q$, $P_0 \ldots P_n$, (ii) some attached processing units 112$q$, or (iii) none of the locally attached processing units 112$q$. For an inclusive L2 cache 114, which requires that the contents at a higher-level cache (e.g., the L1 cache) be a subset of the lower-level L2 cache 114, the contents at each L1 cache (in each processing unit 112$q$-112$t$) are guaranteed to be contained within the respective L2 cache 114. Making the L2 cache 114 inclusive may be useful in multiprocessor systems because the inclusion property limits the effects that cache coherent messages have at higher levels in the memory hierarchy, as overall performance can be improved when the higher-level L1 caches can be isolated from coherence checks and invalidations due to the inclusion property. For example, if the snoop hits in the L2 cache 114, depending on whether the L2 cache 114 has individually tracked whether each processing unit has cached the line, the L2 cache 114 needs to either (i) forward a snoop to all locally attached processing units 112 if the L2 cache 114 has no direct tracking with respect to L1 accesses or (ii) forward the snoop to none or only to some of the locally attached processing units 112 if the L2 cache 114 has inclusive bits. As such, when the L2 cache 114 is inclusive, the L2 cache 114 has an inherent snoop filtering capability in that an inbound snoop from the serialization point 160 that misses in the L2 cache 114 clearly does not need to be forwarded to any locally attached processing unit 112. However, inclusive cache designs inherently waste area and bandwidth, as every cache line in the higher levels is duplicated in the lower levels, resulting in additional area cost, and updates in the lower levels trigger many more updates in other levels, resulting in additional bandwidth cost. Furthermore, the inclusion property can reduce the L2 cache 114 effectiveness, especially when several processing units 112 are sharing the same L2 cache 114 (although once the decision to make the L2 cache 114 has been made, the inclusion property may provide an efficient and cheap fine-grained filter).

In an implementation that instead makes the L2 cache 114$q$ at M-q 110$q$ non-inclusive, the serialization point 160 could still have the ability to filter whether snoops should be forwarded to M-q 110$q$. However, the L2 cache 114$q$ would not necessarily know to which processing units 112$q$ ($P_0 \ldots P_n$) the snoop should be forwarded. Also, when a locally attached processing unit 112$q$ (e.g., $P_0$) initiates an update request for a particular target memory location, the L2 cache 114q would need to determine whether to send a local snoop to the other locally attached processing units 112q, regardless of whether or not a request to the serialization point 160 is needed.

If the L2 cache 114q can neither filter external inbound snoop traffic corresponding to the outbound arrows 154 in FIG. 1 nor filter internal snoop traffic, the attached processing units 112q could be quickly overwhelmed with substantial unnecessary snoops. In particular, the snoops may be unnecessary because each processing unit 112q generally operates within the pages and address ranges that the respective processing unit 112q owns, whereby most snoop traffic would be expected to find a miss in the L1 cache in the event that there is no snoop filtering. In that sense, any snoop that performs a lookup in the local L1 cache and finds a miss was theoretically unnecessary. Unnecessary snoops coming to an L2 cache 114 can have an adverse impact on system performance, but unnecessary snoops coming to an individual processing unit 112 (i.e., the local L1 cache associated therewith) have a greater adverse impact on system performance because locally executing instructions highly utilize the L1 cache. Snoop traffic to the L1 cache therefore perturbs instruction execution flow at the processing units 112 more than snoop traffic to the L2 cache 114.

Accordingly, the various aspects and embodiments described herein may utilize a snoop filter that has the advantages that a coarse-grained snoop filter may offer with respect to low area and low latency while also having the manageability advantages associated with a fine-grained snoop filter whereby the ability to filter snoops does not diminish and false positives are not accumulated as time progresses, which may serve the overarching goal to reduce unnecessary snoops as much as possible.

Figure 2:
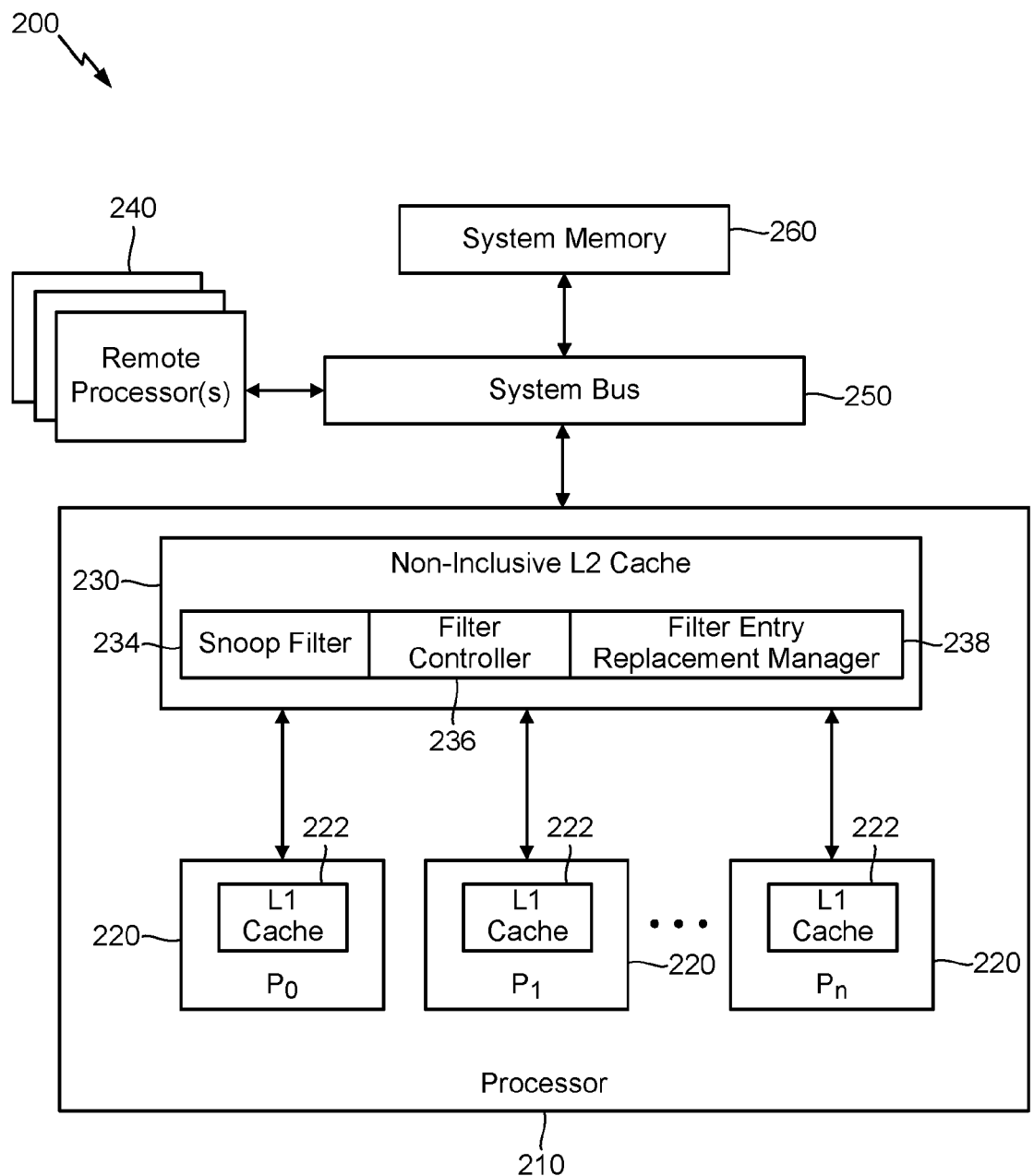
FIG. 2 illustrates an exemplary multiprocessor architecture that implements a self-healing coarse-grained snoop filter, according to various aspects.

For example, according to various aspects, FIG. 2 illustrates an exemplary multiprocessor system 200 that includes at least one processor 210 that has a non-inclusive Level-2 (L2) cache 230 and a snoop filter 234 implemented therein to filter snoops to one or more processing units among multiple attached processing units 220 that share the non-inclusive L2 cache 230. In particular, the non-inclusive L2 cache 230 may generally dispense with the requirement that contents in Level-1 caches 222 associated with the individual processing units 220 be contained in the lower-level L2 cache 230. For example, whereas evicting a victim entry from an inclusive cache (e.g., L2 cache 230) would require a corresponding back-invalidation and eviction from any higher-level cache(s) (e.g., L1 caches 222), the non-inclusive L2 cache 230 does not require the L1 caches 222 to evict entries that correspond to a victim entry evicted from the non-inclusive L2 cache 230.

Accordingly, the L1 caches 222 may contain data that has been evicted from the non-inclusive L2 cache 230. As such, to address problems that may arise whereby the non-inclusive L2 cache 230 would not necessarily know to which processing units 220 to forward an external inbound snoop and/or whether to send a local snoop to one or more locally attached processing units 220 when another locally attached processing unit 220 initiates a request to update a particular target memory location, the snoop filter 234 may maintain entries that represent the cache lines that all the local processing units 220 own within the local L1 caches 222. For example, in various embodiments, the snoop filter 234 may have a coarse-grained implementation, as a fine-grained snoop filter (e.g., an inclusive L2 cache) is not possible in a non-inclusive implementation that dispenses with the requirement to duplicate the contents in the Level-1 caches 222 at the lower-level L2 cache 230. Furthermore, a fine-grained snoop filter, such as a duplicate L1 tag, may be undesirable due to the high area cost associated therewith, and a Bloom filter is also not desirable due to the false positives and the limited ability to maintain the filter in real-time to reduce the false positives.

Accordingly, the snoop filter 234 shown in FIG. 2 may have a coarse-grained implementation, wherein a filter controller 236 and a filter entry replacement manager 238 may be used to self-correct the snoop filter 234 when a limit on the snoop filter 234 has been reached. In various embodiments, the snoop filter 234 may be designed with any granularity (e.g., 1 KB, 1 MB, 1 GB, etc.) to accommodate working sets associated with one or more application software threads executing on the locally attached processing units 220 (e.g., 16 MB). However, an operating system generally cannot be relied upon to allocate a contiguous physical address space to meet the needs associated with the application software threads. For example, in response to a particular application requesting a 128 KB address space in a system memory 260, which may include random access memory (RAM) (e.g., dynamic RAM (DRAM), static RAM (SRAM), etc.), the operating system may assign thirty-two (32) 4 KB pages that are randomly distributed throughout the system memory 260.

In various embodiments, the coarse-grained snoop filter 234 may track memory blocks that have a 4 KB (page) granularity. However, those skilled in the art will appreciate that the snoop filter 234 may be implemented to filter (or track) eight (8) pages or any other suitable number pages that may be appropriate depending on the area budget and workload needs in the multiprocessor system 200. For example, assuming that the L1 cache(s) 222 have a 16 KB capacity and a 4 KB page size, as few as four (4) pages could completely fill the L1 cache(s) 222, which may be overly restrictive in certain implementations. Accordingly, the snoop filter 234 may be implemented to filter up to n pages per processing unit 220, where n may have an implementation-specific value dependent on the area budget and workload needs in the multiprocessor system 200. Alternatively, in various embodiments, the snoop filter 234 may be designed to have a pool of entries that are shared among the various locally attached processing units 220. As such, the overall concept is that the snoop filter 234 can be designed to track any suitable number of memory blocks using entries that are dedicated to and/or shared among the various locally attached processing units 220, but at some point the snoop filter 234 may reach a limit in what can be tracked.

For example, in various embodiments, the non-inclusive L2 cache 230 and each L1 cache 222 may be empty at reset time. As one or more processing units 220 start to access memory locations in the system memory 260, a request may be sent to a system bus 250 configured to intercouple various components in the multiprocessor system 200 and to manage data transfers among the various components in the multiprocessor system 200. Accordingly, when a particular processing unit 220 (e.g., processing unit $P_0$) requests access to a target memory block in the system memory 260 (e.g., to read or write to the target memory block), the processing unit 220 may first determine whether the local L1 cache 222 has an entry corresponding to the target memory block. The L1 cache 222 may check for the contents of the requested target memory block in any cache lines that might contain that address and find a cache "hit" if the target memory block is in the L1 cache 222. Otherwise, if the target memory block is not found in the L1 cache 222, an L1 cache "miss" has occurred, in which case the L2 cache 230 may be checked for the target memory block. If the target memory block is also not found in the L2 cache 230, then an L2 cache miss has occurred. In such a case, a cache line may be copied from the system memory 260 into the non-inclusive L2 cache 230 and into the L1 cache 220 and corresponding cache entries may be created. Furthermore, because the L2 cache 230 has a non-inclusive implementation, when one or more victim entries are evicted to make room to store the new cache entry, the L1 cache 222 may not be required to perform a corresponding eviction. In general, the cache entry created in the L2 cache 230 and the L1 cache 220 may include the copied cache line (i.e., data of the target memory block) as well as the requested location (i.e., a physical address associated with the target memory block) in the system memory 260 (e.g., a "tag").

Furthermore, in various embodiments, an entry may be established in the snoop filter 234 as-needed for each access to a block in the system memory 260 that has not already been established in the snoop filter 234 for the accessing processing unit. Because the snoop filter 234 has a coarse-grained implementation and can only track up to n unique pages per processing unit 220, once a particular processing unit 220 (e.g., processing unit $P_n$) accesses unique page n+1, the snoop filter 234 needs to make a decision. The simplest decision would be to have the snoop filter 234 saturate, meaning that hardware would have to automatically disable the snoop filter 234 with respect to the processing unit 220 that has accessed unique page n+1 because the snoop filter 234 has lost the ability to track the contents at the L1 cache 222 associated therewith. Alternatively, where the snoop filter 234 has a pool of entries shared among the various locally attached processing units 220, the snoop filter 234 may saturate when all entries in the pool have been used and any locally attached processing unit 220 attempts to access a new unique page. Either way, the snoop filter 234 could cheaply track (e.g., via a multi-hot vector) the processing unit(s) 220 for which the ability to filter has been lost, which essentially includes any processing unit(s) 220 holding an address that cannot be put into the snoop filter 234, regardless of how the snoop filter 234 allocates or otherwise manages the entries. However, when the snoop filter 234 loses the ability to filter snoops for one or more processing units 220, the snoop filter 234 should still be able to filter snoops effectively with respect to the other processing units 220 until the other processing units 220 also request to hold an address that the snoop filter 234 cannot log. As such, when the snoop filter 234 loses the ability to filter for a particular processing unit 220 due to limitations in the number of pages that can be tracked, the snoop filter 234 may set a bit in the multi-hot vector that corresponds to the processing unit 220 for which the ability to filter has been lost. When the bit corresponding to the processing unit 220 has been set in the multi-hot vector (or other suitable tracking mechanism), the bit may indicate that the snoop filter 234 can no longer filter snoops for the corresponding processing unit 220, which therefore sees all snoops because the snoop filter 234 can no longer filter out the snoops for that processing unit 220.

Accordingly, regardless of whether the snoop filter 234 uses dedicated or shared entries, disabling the snoop filter 234 with respect to one or more of the locally attached processing units 220 for which the ability to filter snoops has been lost may cause various problems. For example, the L2 cache 230 would not know whether to forward any external inbound snoops received from one or more remote processors 240 to the processing unit(s) 220 for which filtering has been disabled. Accordingly, to handle this condition, the L2 cache 230 would be forced to simply forward all external inbound snoops to the processing unit(s) 220 for which snoop filtering was disabled (e.g., $P_n$). Moreover, when another locally attached processing unit 220 (e.g., processing unit $P_0$) initiates a request to update a target memory location, the snoop filter 234 would be unable to determine whether to send a local snoop to the processing unit(s) 220 for which filtering has been disabled regardless of whether a request to the system bus 250 is needed to access the target memory location in the system memory 260.

As such, according to various aspects, when the snoop filter 234 has reached a limit on an ability to track unique memory blocks, the snoop filter 234 may initiate a self-healing (or self-correcting) mode to maintain the ability to track unique memory blocks. More particularly, in various embodiments, the filter controller 236 may use the filter entry replacement manager 238 to choose an entry to evict from the snoop filter 234. For example, in various embodiments, the filter controller 236 may use the filter entry replacement manager 238 to determine a least-recently established entry based on age in the snoop filter 234 (e.g., FIFO based on an order in which the entries were installed in the snoop filter 234), a least-recently used entry, a least-frequently used entry, a random entry, etc. Furthermore, in the event that the entry to be evicted from the snoop filter 234 is the least-frequently used entry, the least-frequently used metric may be determined according a ratio between accesses to the entry and overall recent accesses. For example, in various embodiments, when selecting the victim entry based on the least-frequently used entry, the victim entry may be an entry with the fewest accesses among a predetermined number of least recently accessed entries (e.g., the four (4) least recently accessed entries), thereby preventing a recently installed entry that will likely have a low access count from being the victim entry. Furthermore, in various embodiments, a timer can be used to periodically decrement all counts such that entries that were formerly "hot" will "cool" over time unless the formerly hot entries continue to be accessed. In response to the filter controller 236 choosing the victim entry to evict from the snoop filter 234, the L1 cache(s) 222 may be notified to evict every line from the memory block (e.g., page) that corresponds to the victim entry, wherein the L1 cache(s) 222 may then unroll the request into a series of lookups to evict the page/range that corresponds to the victim entry line-by-line. Alternatively, the L1 cache(s) 222 may simply flush all cache sets that map to the victim entry without performing a lookup, which may eliminate the need to perform tag reads (although flushing all the cache sets that map to the victim entry may have a side-effect in that some non-target pages may end up being unnecessarily evicted).

According to various aspects, the snoop filter 234 may then wait on a completion indication from the L1 cache(s) 222, during which time the victim entry to be evicted from the snoop filter 234 may remain in the snoop filter 234 and continue the filter function associated therewith. Furthermore, the snoop filter 234 may include an "overflow area" to temporarily store the new entry to be established, wherein the new entry to be establish may perform the filter function associated therewith from the overflow area until the new entry can be moved into the main snoop filter 234 (i.e., after the victim entry has been evicted). Alternatively, snoop filtering could be temporarily disabled until the new entry is established in the snoop filter 234, with the effect that any snoop that comes along would be forwarded to the L1 cache(s) 222.

In context with the description provided herein, the term "flush" and variants thereof may generally mean that a cache line is invalidated if the cache line is clean or moved to a lower-level cache/memory if the cache line is modified (e.g., from an L1 cache 222 to the L2 cache 230, from the L2 cache 230 to an L3 cache, if present, or to system memory 260 if an L3 cache is not present, and so on). Accordingly, any references or descriptions that relate to "flushing" a particular cache contemplates implementations in which the cache contents are invalidated entirely and/or in which the cache contents are moved to a lower-level cache/memory and invalidated. Alternatively, any references or descriptions that relate to invalidating a particular page, range, etc. contemplates implementations in which any cache lines that fall within or otherwise map to a specified page, range, etc. are invalidated and/or in which the cache lines that fall within or otherwise map to the specified page, range, etc. are moved to a lower-level cache/memory and then invalidated. In the latter case, those skilled in the art will appreciate that only the cache lines within the victim range that actually exist in the cache at that time would need to be moved to the lower-level cache/memory (e.g., in an implementation where a victim range encompasses sixty-four (64) 64 B lines, the L1 cache 222 may have only accessed some subset of the range and therefore would only need to move that subset to the L2 cache 230).

In various embodiments, rather than choosing a victim entry to evict from the snoop filter 234, the self-healing mode may flush the snoop filter 234 and the entire L1 cache(s) 222 when the snoop filter 234 overflows and snoop filtering may then start over as from reset because all caches are empty. Although flushing the entire snoop filter 234 and the entire L1 cache(s) 222 may not necessarily be desirable from a performance or power perspective, starting over from reset with all caches empty may make room in the snoop filter 234 for new pages, permit snoop filtering functions to continue, and simplify entry replacement in the snoop filter 234 after becoming full. If capacity in the snoop filter 234 is balanced to the expected workload demands on the lifetime of the contents at the L1 caches 222, the power and performance impact of flushing the entire snoop filter 234 and L1 cache(s) 222 is mitigated because there may be a corresponding reduction in such flush-all events. If the processor 210 is in an environment where the processor 210 is frequently put to sleep or encounters frequent context changing events (e.g., interrupts), then the lifetime of the L1 cache 222 contents will be shorter. On the other hand, if the snoop filter 234 capacity is smaller relative to the workload demands for the lifetime of the memory blocks in the L1 cache 222, then the presence of the L2 cache 230 may mitigate self-healing the snoop filter 234 via flush-all events (e.g., because the L2 cache 230 is likely to contain much of the data flushed from the L1 cache(s) 222).

Figure 3:
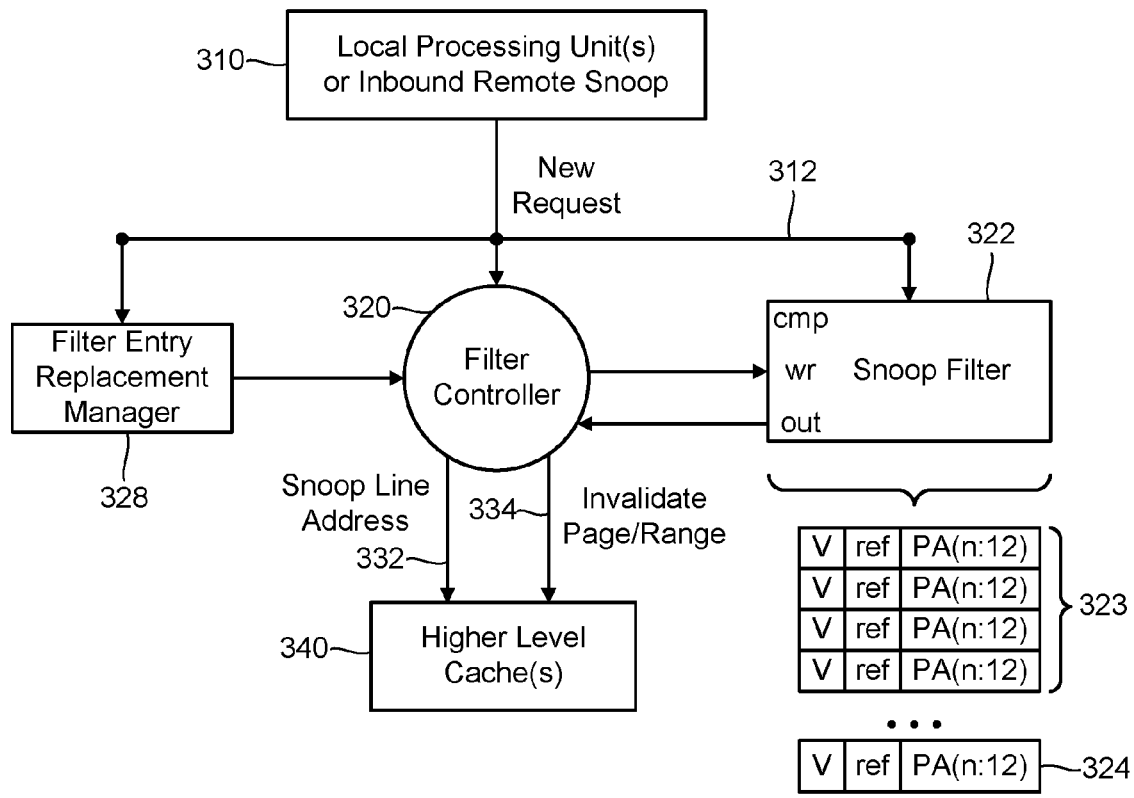
FIG. 3 illustrates an exemplary architecture showing more detail relating to how the self-healing coarse-grained snoop filter may operate, according to various aspects.

According to various aspects, FIG. 3 illustrates the architecture associated with the coarse-grained snoop filter described above in more detail, wherein the architecture shown in FIG. 3 may be implemented at a non-inclusive Level-2 (L2) cache in any suitable coherent multiprocessor system (e.g., a server processor, a mobile device processor, a desktop computer processor, etc.). As shown in FIG. 3, a new request may be received at the coarse-grained snoop filter as depicted at 312, wherein the new request may comprise a lookup-only request from a remote processing unit 310 (e.g., an inbound snoop) and/or a lookup-and-update request from a locally attached processing unit 310. In either case, the new request 312 may be provided to a filter controller 320, a filter entry replacement manager 328, and the snoop filter 322, which may contain one or more entries 323. As depicted in FIG. 3, each entry 323 in the snoop filter 322 may include a valid (V) bit that may be set to indicate that the entry 323 is valid and should be considered when performing a lookup in the snoop filter 322. Furthermore, each entry 323 may include a field with one or more reference (ref) bits used to indicate which locally attached processing unit(s) 310 need to see the snoop. For example, the reference bits may generally comprise a bit vector that tracks which processing unit(s) 310 have cached one or more lines within the range that the corresponding entry 323 covers, or the reference bits may alternatively be an identifier (ID) associated with one processing unit 310 to which the entry 323 has been assigned. In various embodiments, still referring to FIG. 3, each entry 323 in the snoop filter 322 may further include a page address (PA) field with one or more bits to indicate the physical address associated with the filter range that the entry 323 covers (e.g., a page address, which would be PA(43:12) for a 4 KB page in a 44b physical address space). When the entry 323 is valid, the PA field may be compared against the physical address associated with the operation (op) performing the filter lookup to determine whether there is a hit in the snoop filter 322, in which case the reference (ref) bits for the entry 323 resulting in the hit are multiplexed out to determine where to forward the snoop.

According to various aspects, with respect to a lookup-only request 312 from a remote processing unit 310, the lookup-only request 312 may be provided to the filter controller 320, the filter entry replacement manager 328, and the snoop filter 322. In response to the lookup-only request finding a hit among one or more entries 323 contained in the snoop filter 322, the filter controller 320 may forward the snoop line address to one or more higher-level caches 340 based on the reference bits associated with the hitting entry 323, as depicted at 332. Alternatively, in response to the lookup-only request resulting in a miss (e.g., where the lookup does not match any entries 323 contained in the snoop filter 322), the filter controller 320 may filter out the snoop, meaning that the filter controller 320 does not forward the inbound snoop to the higher-level caches 340. Furthermore, in various embodiments, the filter entry replacement manager 328 may be configured to track how many remote snoops are hitting each entry 323 in the snoop filter 322 and/or otherwise make adjustments to the least-recently and/or least-frequently used logic when an entry 323 matches a remote snoop. For example, when external inbound snoops from remote processing units 310 are frequently hitting a particular entry 323, the filter entry replacement manager 328 may consider that entry 323 to be a good candidate for replacement because the process accessing that entry 323 might have migrated to another (remote) processing unit 310. As such, even if one or more local processing units 310 have frequently accessed the entry 323 but not very recently, the filter entry replacement manager 328 may consider the entry 323 to be a replacement candidate. Although selecting a more-recently accessed entry 323 to be replaced may generally be undesirable, the filter entry replacement manager 328 may nonetheless select the entry 323 to be replaced sooner when remote snoops are hitting the entry 323 rather than waiting until the entry 323 becomes the least-recently accessed entry 323. If an entry 323 is getting many hits from remote snoops, then those snoops will not be filtered out. However, if the hits from the remote snoops are due to the fact that the entry 323 has aged to the point that the process accessing the entry 323 has moved or the entry 323 covers a range that is only used sparsely at the local processing units 310, then the entry 323 has diminished or little usefulness in the snoop filter 322 and is likely causing more snoops to be forwarded to the local processing unit(s) 310 than necessary, which undermines the goal to reduce the number of unnecessary snoops.

According to various aspects, when the new request received at 312 is a lookup-and-update received from a local processing unit 310, the filter controller 320 may similarly perform a lookup to determine whether any entries 323 in the snoop filter match the target memory location indicated in the new request 312. In general, when the new request 312 originates from a local processing unit 310, the lookup in the snoop filter 322 serves two purposes. First, if the L1 cache at the local processing unit 310 is going to install the target memory block in the L1 cache (e.g., a read op), the lookup in the snoop filter 322 is used to determine whether that processing unit 310 already has a valid entry for the target range or whether a new one needs to be established. If the op is simply returning data to the requestor, there may not be a need to send a snoop to other local processing units 310, and doing so is generally not necessary. However, in some processor implementations, the L1 caches may track whether the local copy of the cache line is unique or shared, in which case the L1 caches may need to see a snoop in the event that another processing unit reads the line such that the state can be downgraded to shared if necessary. Secondly, if the op (or request type) is going to modify the target memory block, the lookup in the snoop filter 322 may be used to determine whether any other local processing unit(s) 310 need to see a snoop invalidation to remove a (soon to be stale) copy of the line from the L1 cache associated therewith. Accordingly, in response to the lookup from the local processing unit 310 finding a hit among the entries 323 contained in the snoop filter 322, the filter controller 320 may forward the snoop line address to the higher-level caches 340 based on the reference bits associated with the matching entry 323, as depicted at 332 (although the snoop would generally not be sent back to the originating local processing unit 310 unless the implementation had a particular need to do so in certain cases). Furthermore, the filter controller 320 may update the filter entry replacement manager 328 based on the access to the target memory location. For example, the filter entry replacement manager 328 may be updated to indicate that the entry 323 that resulted in the hit was accessed such that the least-recently-used entry 323, the least-frequently used entry 323, etc. can be updated as-needed based on the access to the matching entry 323.

In various embodiments, in response to the lookup resulting in a miss, the filter controller 320 may similarly filter out the snoop and not forward a local snoop to any higher-level caches 340. Furthermore, as the memory block is accessed in the system memory, the snoop filter 322 and the filter entry replacement manager 328 are suitably updated. For example, in the event that the snoop filter has available space, a new entry 323 may be installed in the snoop filter 322 to correspond to the accessed memory block and the filter entry replacement manager 328 may be appropriately updated such that new entry 323 becomes the most-recently established entry 323. However, in the event that the snoop filter 322 does not have available space to store a new entry 323, the self-healing aspects described above may be initiated. For example, the filter controller 320 may use the filter entry replacement manager 328 to choose a victim entry 323 to evict from the snoop filter 322 (e.g., the least-recently established entry 323, the least-recently used entry 323, the least-frequently used entry 323, a random entry 323, etc.). Furthermore, the new entry 323 may be temporarily stored in an overflow area 324. The filter controller 320 may then notify the higher-level caches 340 to evict every line from the memory block (e.g., page) that corresponds to the victim entry 323, wherein the notification may include an "invalidate page/range" request with the appropriate reference bits set to indicate which higher-level caches 340 need to perform the page/range invalidation, as depicted at 334.

The filter controller 320 may then wait on an acknowledgement or completion indication from the higher-level cache(s) 340, during which time requests from the local processing units 310 may stall. However, the victim entry 323 may remain in the snoop filter 322 and continue to perform the filter function associated therewith and the new entry may perform the filter function associated therewith from within the overflow area 324 until the new entry can be moved into the main snoop filter 322 (i.e., after the victim entry 323 has been evicted to make room). In such cases, new external requests from remote snoops 310 may continue to perform lookups normally, whereby in the event that a new external request "hits" the new entry in the overflow area 324 or the victim entry 323 that has not yet been evicted from the main snoop filter 322, the snoop may be forwarded to the higher-level cache(s) 340 in substantially the same manner described above. Furthermore, in certain use cases, the overflow area 324 may be extended to hold more than one pending update (e.g., two or more pending new entries), in which case new lookup-and-update requests from the local processing units 310 may continue to flow as described above until the overflow area 324 has no more available resources to store pending updates. Alternatively, snoop filtering could be temporarily disabled until the new entry is established in the main snoop filter 322, with the effect that any inbound snoop would be forwarded to the higher-level cache(s) 340.

Figure 4A:
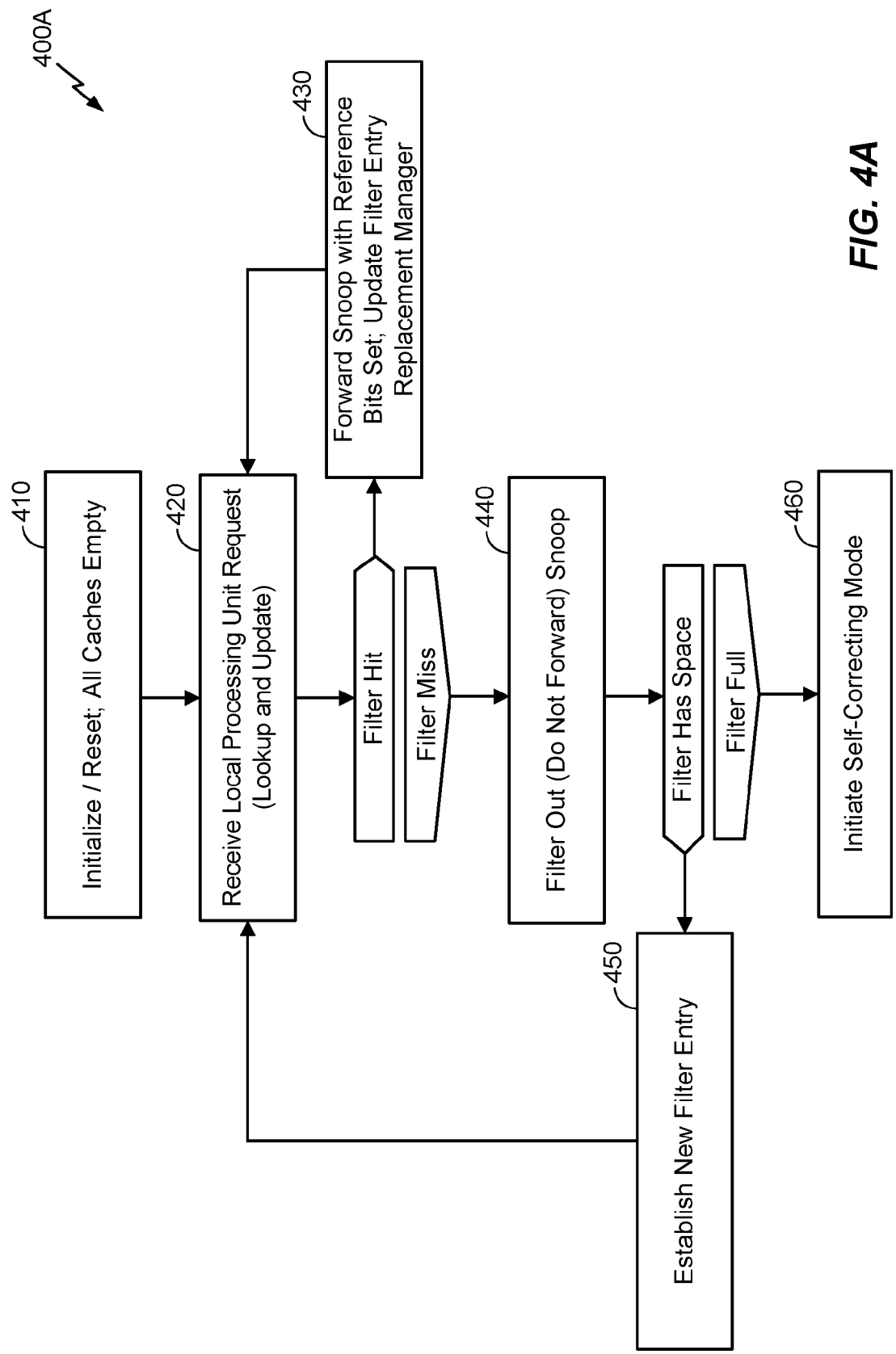
FIG. 4A illustrates an exemplary method to initiate a coarse-grained snoop filter self-healing (or self-correcting) mode, according to various aspects.

According to various aspects, FIG. 4A illustrates an exemplary method 400A to initiate a coarse-grained snoop filter self-healing (or self-correcting) mode, which may generally be performed when a local processing unit seeks to establish a new entry in the snoop filter when the snoop filter does not have any available space to track more entries for that local processing unit. As such, in the following description, the method 400A shown in FIG. 4A may be performed based on an assumption that all read and write ops would be expected to perform a lookup in the snoop filter and that a new entry is to be established in the snoop filter upon finding a miss because the higher-level (e.g., L1) cache intends to cache the line being accessed. Accordingly, in various embodiments, the method 400A shown in FIG. 4A may be implemented at a non-inclusive Level-2 (L2) cache in any suitable coherent multiprocessor system, wherein the non-inclusive L2 cache and any locally attached L1 caches may initially be empty at initialization and/or reset time, as shown at block 410. In various embodiments, at block 420, a new request may be received at the coarse-grained snoop filter from a locally attached processing unit, wherein the new request may comprise a lookup-and-update request. In response to one or more entries in the snoop filter matching the target memory location indicated in the lookup-and-update request such that the lookup finds a "hit" in the snoop filter, a local snoop may be forwarded to one or more of the locally attached L1 caches based on the reference bits that indicate the processing unit(s) needing to see the snoop, as depicted at block 430. In various embodiments, the local snoop may be forwarded along with a line address for a single L1 cache line based on the address indicated in the original request that triggered the snoop filter lookup. Furthermore, at block 430, a filter entry replacement manager may be updated based on the access to the target memory location indicated in the lookup-and-update request. For example, the filter entry replacement manager may be updated to indicate that the entry that resulted in the hit was accessed such that the least-recently-used entry, the least-frequently used entry, etc. can be appropriately updated as-needed.

In various embodiments, at block 440, the filter controller may filter out (not forward) any snoop to the locally attached L1 caches in response to the lookup resulting in a miss. Furthermore, as the memory block is accessed in the system memory, the snoop filter and the filter entry replacement manager are suitably updated. For example, in the event that the snoop filter lookup for a memory block finds a miss and the snoop filter has available space, a new entry may be installed in the snoop filter to correspond to the accessed memory block at block 450, and the filter entry replacement manager may be appropriately updated at block 450 such that new entry becomes the most-recently established entry. However, in the event that the snoop filter lookup finds a miss and therefore needs to establish a new entry but does not have available space to store a new entry, the self-healing aspects described above may be initiated, as depicted at block 460. In various embodiments, example methods to implement the self-healing aspects are described in further detail below.

Figure 4B:
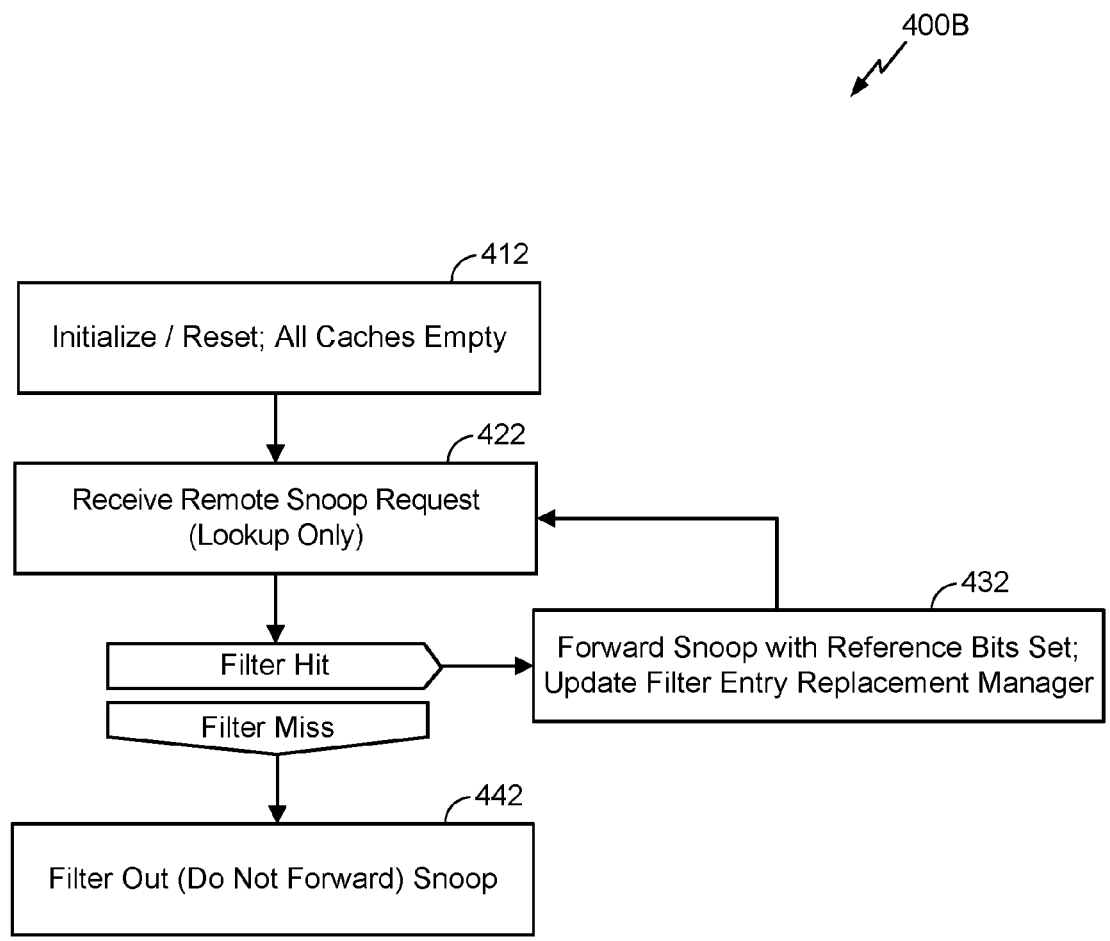
FIG. 4B illustrates an exemplary method to perform a lookup in a coarse-grained snoop filter without establishing a new entry or initiating a self-healing (or self-correcting) mode, according to various aspects.

According to various aspects, referring now to FIG. 4B, an exemplary method 400B is illustrated to perform a lookup in the coarse-grained snoop filter described herein without establishing a new entry or initiating the self-healing (or self-correcting) mode. As such, the method 400B shown in FIG. 4B may be performed in response to any remote snoops (e.g., lookup-only requests) and/or in use cases where a local processing unit performing the lookup does not intend to cache the line being accessed such that telling the snoop filter that the local processing unit has a cached copy may be undesirable because doing so would result in unnecessary snoop traffic. In various embodiments, the method 400B shown in FIG. 4B may therefore be performed to handle lookup-only requests that do not establish new entries in the snoop filter or initiate the self-healing (or self-correcting) mode. Accordingly, as in the method 400A shown in FIG. 4A, the non-inclusive L2 cache and the locally attached L1 caches may initially be empty at initialization and/or reset time, as shown at block 412. The coarse-grained snoop filter may then receive a lookup-only request at block 422, wherein the lookup-only request may comprise a remote snoop request or be originated at a locally attached processing unit that does not intend to cache the line being accessed in the L1 cache associated therewith. In various embodiments, at block 442, the filter controller may filter out (not forward) any snoop to the locally attached L1 caches in response to the lookup resulting in a miss. However, in response to one or more entries in the snoop filter matching the target memory location indicated in the lookup-only request such that the lookup finds a "hit" in the snoop filter, a local snoop may be forwarded to one or more of the locally attached L1 caches based on the reference bits that indicate the processing unit(s) needing to see the snoop, as depicted at block 432. In various embodiments, the local snoop may be forwarded along with a line address for a single L1 cache line based on the address indicated in the original request that triggered the snoop filter lookup. Furthermore, at block 432, the filter entry replacement manager may be updated based on the access to the target memory location indicated in the lookup-only request. For example, the filter entry replacement manager may be updated to indicate that the entry that resulted in the hit was accessed such that the least-recently-used entry, the least-frequently used entry, etc. can be appropriately updated as-needed. Alternatively, as mentioned above, the filter entry replacement manager may be updated if the lookup-only request originated from a remote processing unit to appropriately track how many remote snoops are hitting each entry in the snoop filter and/or otherwise make adjustments to the least-recently and/or least-frequently used logic when an entry matches a remote snoop request.

Figure 5A:
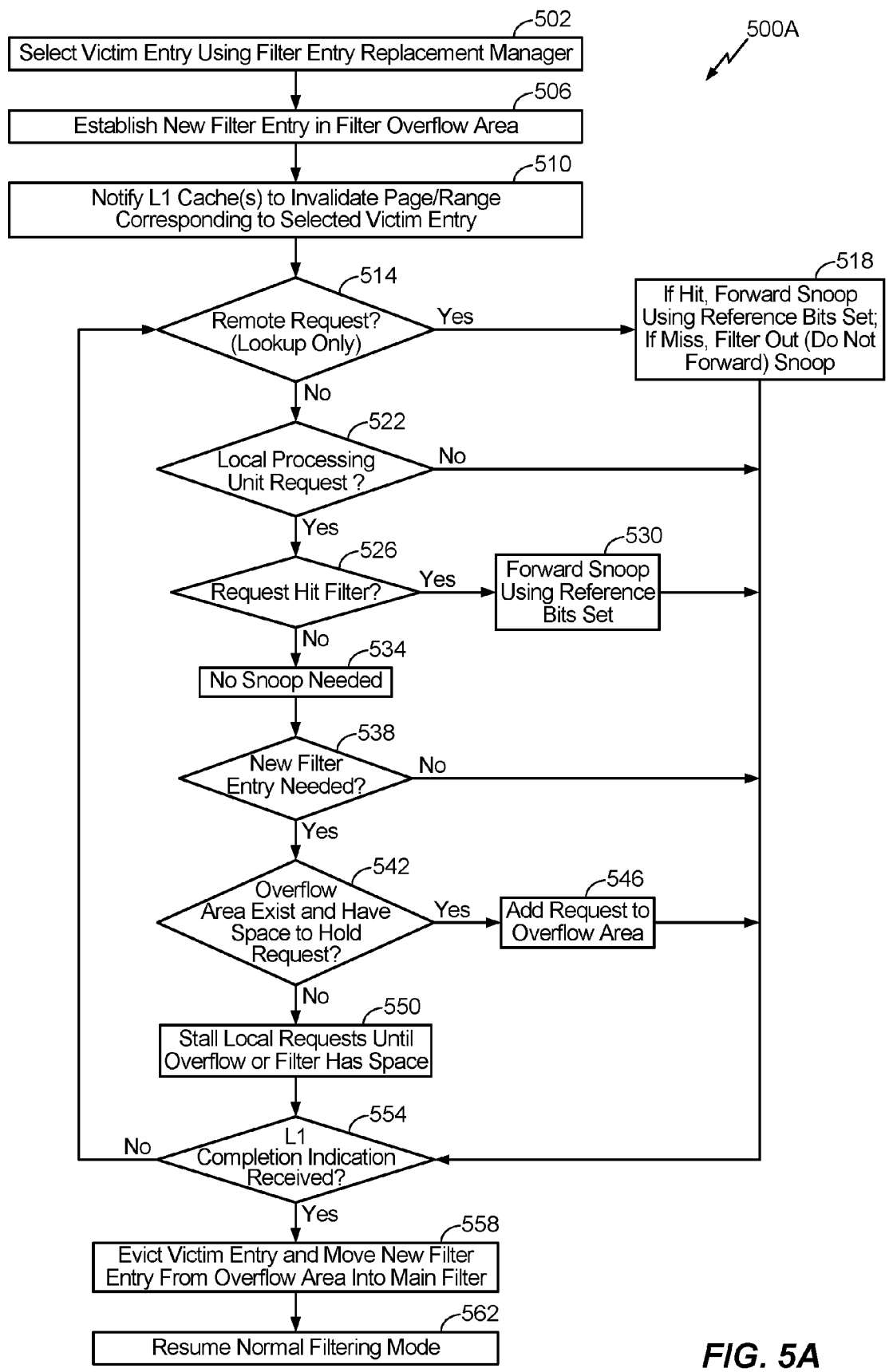
FIG. 5A illustrates an exemplary method to self-heal a coarse-grained snoop filter that has reached a limit on an ability to filter snoops, according to various aspects.

According to various aspects, FIG. 5A illustrates an exemplary method 500A to self-heal a coarse-grained snoop filter that has reached a limit on an ability to filter snoops. More particularly, at block 502, the filter entry replacement manager may be used to select a victim entry to evict from the snoop filter, wherein the selected victim entry may comprise the least-recently established entry, the least-recently used entry, the least-frequently used entry, a random entry, etc. In various embodiments, at block 506, the new entry may be temporarily stored in an overflow area and the L1 caches may be notified to evict every line from the memory block (e.g., page) that corresponds to the victim entry at block 510. For example, the notification sent to the L1 caches at block 510 may comprise an "invalidate page/range" request with the appropriate reference bits set. While waiting on an acknowledgement or completion indication from the L1 cache(s), lookups from local processing units may still occur until there is a need to establish a new entry in the snoop filter and there is no room available to store a new entry (e.g., the overflow area is full or not implemented). However, in certain use cases, the overflow area used to temporarily store the new entry may be extended to hold more than one pending update (e.g., two or more pending new entries), in which case new lookup-and-update requests from the local processing units may continue to flow as described above until the overflow area has no more available resources to store pending updates. Furthermore, as long as new requests hit in the snoop filter, the new requests do not need to establish new entries and therefore are generally permitted to flow. In any case, the victim entry (or entries) may remain in the snoop filter and continue to perform the filter function associated therewith and the new entry (or entries) may perform the filter function associated therewith from within the overflow area until the new entry can be moved into the main snoop filter.

As such, in response to receiving a new request, a determination may be as to whether the new request is a remote (lookup-only) request at block 514. In response to determining that the new request is a remote request and that the remote request results in a hit, at block 518, the snoop may be forwarded to the L1 cache(s) whose reference bits are set in substantially the same manner described above. Alternatively, if the new request is a remote request that results in a miss, the snoop may be filtered out at block 518, meaning that the remote snoop is not forwarded to the higher-level L1 cache(s). In various embodiments, a determination may then be made at block 554 as to whether the acknowledgement or completion indication has been received from the L1 cache(s), wherein the method 500A may return to block 514 to check for a new request while waiting on the acknowledgement or completion indication. In various embodiments, once the acknowledgement is received from the L1 cache(s), the victim entry (or entries) may be evicted from the snoop filter at block 558, and the new entry (or entries) may be moved from the overflow area into the main snoop filter, at which time the normal filtering mode may resume at block 562.

In various embodiments, as mentioned above, lookups from local processing units may continue to flow as normal while the self-healing or self-correcting aspects are being carried out until there is a need to establish a new entry in the snoop filter and the snoop filter does not have any more room to hold such a new entry (e.g., because the overflow area is full or not implemented). As such, if the previously described determination made at block 514 indicated that the new request was not a remote request, the method 500A may comprise determining whether a new request was received from a local processing unit at block 522. In response to determining that a new request was not received from a local processing unit, there is neither a remote request nor a local request to be processed (i.e., there is no request at all), whereby the method may proceed to block 554 to check/re-check whether the acknowledgement or completion indication has been received from the L1 cache(s), as described above. However, in response to determining that a new request was received from a local processing unit at block 522, a further determination may be made at block 526 as to whether the request hit the snoop filter (e.g., a matching range was found in the snoop filter). In response to a request from the local processing unit hitting the snoop filter, at block 530 a local snoop may be forwarded to one or more L1 cache(s) whose reference bits are set in substantially the same manner described above (although the local snoop generally would not be sent back to the originating local processing unit). Alternatively, no snoop may be needed if the request results in a miss, as indicated at block 534, and a further determination may be made at block 538 as to whether a new filter entry is needed. In the event that a new filter entry is needed, block 542 may comprise determining whether the overflow area exists and has space to hold the request, in which case the request may be added to the overflow area at block 546. Otherwise, if the overflow area is not implemented or lacks space to hold the request, local requests may stall at block 550 until the overflow area or the main snoop filter has space to store the new entry. The method 500A may thus flow to block 554 where the determination may be made as to whether the acknowledgement or completion indication has been received, wherein the method 500A may return to block 514 to check for a new request while waiting on the acknowledgement or completion indication. In various embodiments, once the acknowledgement is received, the victim entry (or entries) may be evicted from the snoop filter at block 558, and the new entry (or entries) may be moved from the overflow area into the main snoop filter, at which time the normal filtering mode may resume at block 562. In general, those skilled in the art will appreciate that the method 500A illustrated in FIG. 5A may be implemented in hardware, whereby the functions performed at blocks 514 and 554 may be performed in parallel. Accordingly, although the method 500A as illustrated in FIG. 5A shows the various blocks as checking for new requests at blocks 514, 522 before checking for the acknowledgement or completion indication at block 554, those skilled in the art will appreciate that such illustration is for ease of description and clarity only and that checking for the new requests at blocks 514, 522 and for the acknowledgement or completion indication at block 554 may occur in parallel, simultaneously, etc.

Figure 5B:
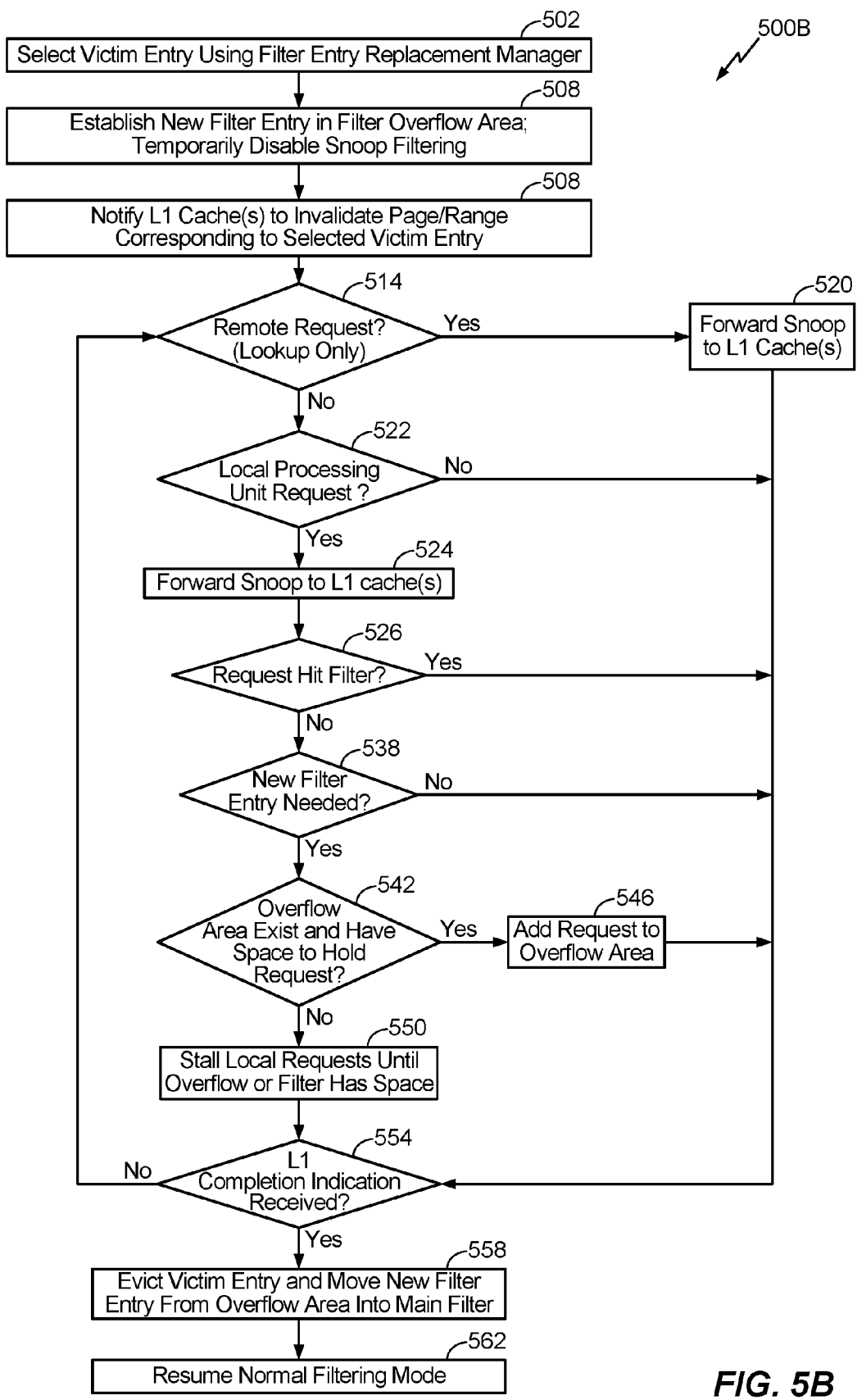
FIG. 5B illustrates another method to self-heal the coarse-grained snoop filter upon reaching the limit on the ability to filter snoops, according to various aspects.

Referring now to FIG. 5B, another method 500B to self-heal the coarse-grained snoop filter upon reaching the limit on the ability to filter snoops is illustrated therein, wherein the method 500B shown in FIG. 5B may be substantially similar to the method 500A shown in FIG. 5A and described in further detail above. However, in the method 500B shown in FIG. 5B, snoop filtering may be temporarily disabled at block 508 after the one or more victim entries have been selected and the one or more new entries to replace the one or more victim entries have been established in the overflow area. Accordingly, in FIG. 5B, when a remote (lookup-only) request is received at block 514, the snoop may be forwarded to the L1 cache(s) at block 520 because filtering has been temporarily disabled. Furthermore, when a request from a local processing unit is received at block 522, the snoop may likewise be forwarded to the L1 cache(s) at block 524 because filtering has been temporarily disabled, although the snoop may generally not be forwarded back to the originating local processing unit unless there is a particular implementation need to do so. In various embodiments, the remaining operations in the method 500B shown in FIG. 5B are essentially the same as those described above with respect to the method 500A shown in FIG. 5A. For example, requests from local processing units may continue to flow as long as new requests hit in the snoop filter and therefore do not need to establish new entries, whereby requests from local processing units may continue until there is a need to establish a new entry in the snoop filter and there is no room available to store a new entry (e.g., the overflow area is full or not implemented). Furthermore, in FIG. 5B, the victim entry (or entries) may remain in the snoop filter and continue to perform the filter function associated therewith and the new entry (or entries) may perform the filter function associated therewith from within the overflow area until the new entry can be moved into the main snoop filter, wherein the logic may continuously check for new requests (e.g., at blocks 514, 522) while waiting on the acknowledgement or completion indication (e.g., at block 554).

Figure 6:
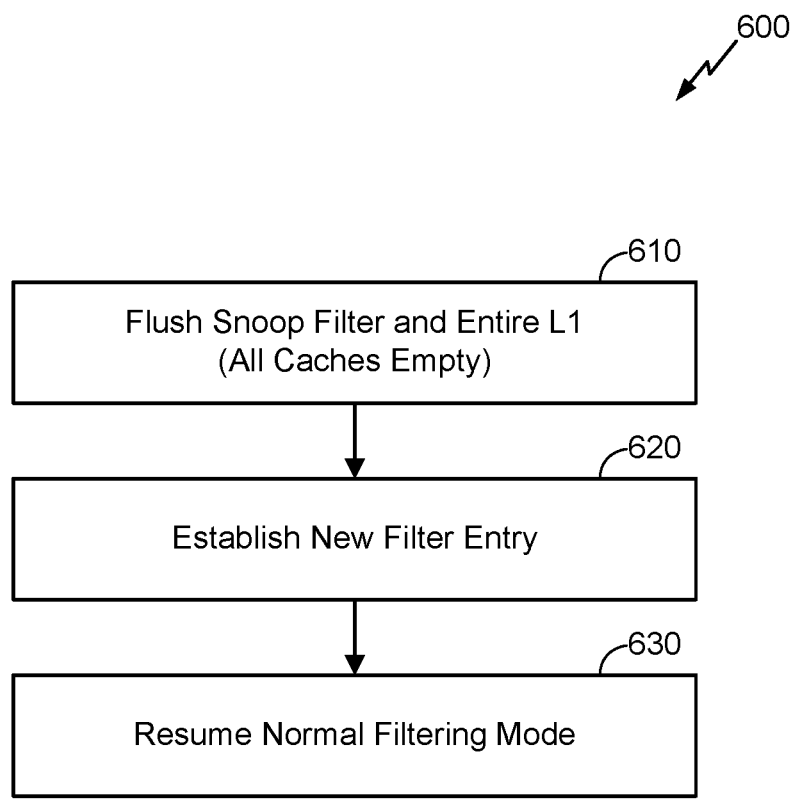
FIG. 6 illustrates an exemplary alternate methodology to self-heal the coarse-grained snoop filter, according to various aspects.

According to various aspects, FIG. 6 illustrates an alternate method 600 that the coarse-grained snoop filter may use to self-heal upon reaching a limit on an ability to filter snoops. In particular, rather than choosing a victim entry to evict from the snoop filter (e.g., as in FIG. 5A and FIG. 5B), the snoop filter may simply be flushed and the entire L1 cache(s) may also be flushed at block 610 when the snoop filter overflows due to reaching the limit on the ability to track unique memory blocks. In various embodiments, if the L1 cache(s) have a write-through implementation, there may be no need to forward snoop traffic to the L1 cache(s) while the flush is in progress. However, if the L1 cache(s) have a write-back implementation, snoops will need to be sent to the L1 caches(s) after the flush request has been made until a "flush done" handshake or other suitable procedure is otherwise completed such that the L2 cache knows that the L1 cache(s) have been flushed. In various embodiments, once the flush has been completed, a new entry may be established in the snoop filter and the filter entry replacement manager may be appropriately updated at block 620, whereby normal snoop filtering may then start over as from reset at block 630 because all caches are empty after the flushing performed at block 610. Accordingly, the method 600 shown in FIG. 6 may essentially start snoop filter over as from reset with all caches empty such that the snoop filter has room for new pages, thereby allowing snoop filtering functions to continue and simplifying the process to replace entries in the snoop filter after overflow. However, as mentioned above, the L2 cache may need to continue to send snoops to the L1 cache(s) while the flush is in progress depending on the L1 cache(s) write-through/write-back policy and implementation specifics until this "restart" point is reached.

Figure 7A:
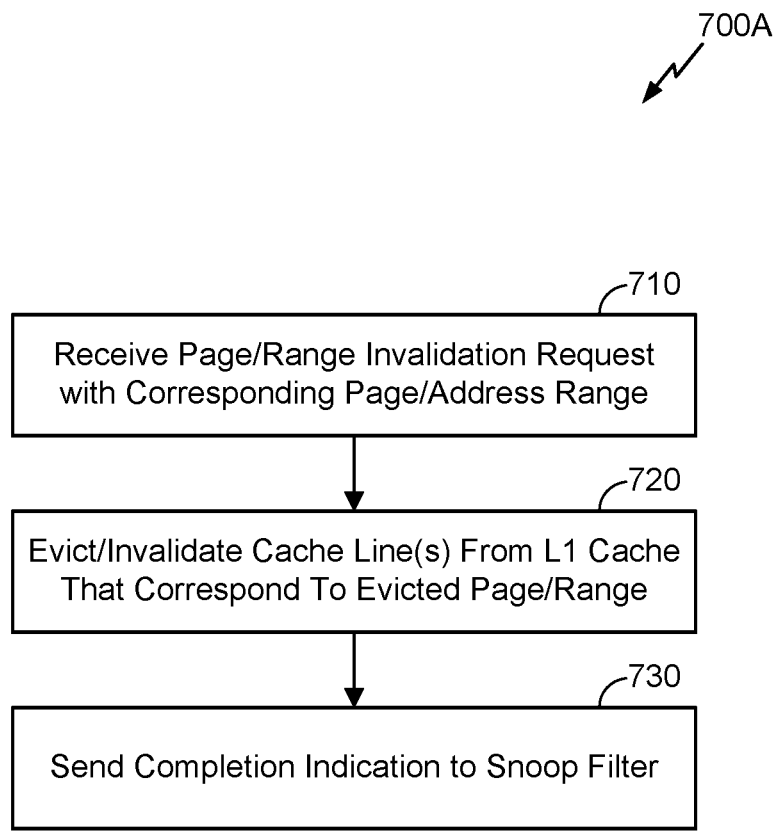
FIG. 7A illustrates an exemplary method that a local Level-1 (L1) cache may perform in relation to self-healing operations performed at a coarse-grained snoop filter that has reached a limit on an ability to filter snoops, according to various aspects.

According to various aspects, FIG. 7A illustrates an example method 700A that may be performed at a local Level-1 (L1) cache in relation to self-healing operations performed at a coarse-grained snoop filter that has reached a limit on an ability to filter snoops. More particularly, as described above, the snoop filter may be implemented at a non-inclusive Level-2 (L2) cache needing to filter snoops to one or more processing units among multiple attached processing units that share the non-inclusive L2 cache. As such, in response to a local lookup-and-update request received at the snoop filter resulting in a miss after the snoop filter has reached the limit on the ability to filter snoops, the snoop filter may initiate the self-healing operations described in further detail above. For example, in various embodiments, the self-healing operations initiated at the snoop filter may comprise selecting one or more victim entries to evict from the snoop filter and establishing one or more new entries in a temporary overflow area. The snoop filter may then send a request to invalidate the page/range that corresponds to the one or more selected snoop filter victim entries to the L1 cache, whereby the L1 cache may receive the page/range invalidation request at block 710. Accordingly, at block 720, the L1 cache may then evict and/or invalidate each cache line that corresponds to the page/range associated with the one or more victim entries to be evicted from the snoop filter. For example, at block 720, the L1 cache may choose to unroll the evicted page/range line-by-line, or alternatively the L1 cache may blindly invalidate all cache sets that map to the one or more victim entries, which may eliminate the need to perform tag reads. In either case, once all cache lines that map to the one or more victim entries have been appropriately invalidated, the L1 cache may send a completion indication to the snoop filter at block 730. The snoop filter may then replace the one or more victim entries in the main snoop filter with the one or more new entries that had been established in the overflow area such that normal filtering operations may resume.

Figure 7B:
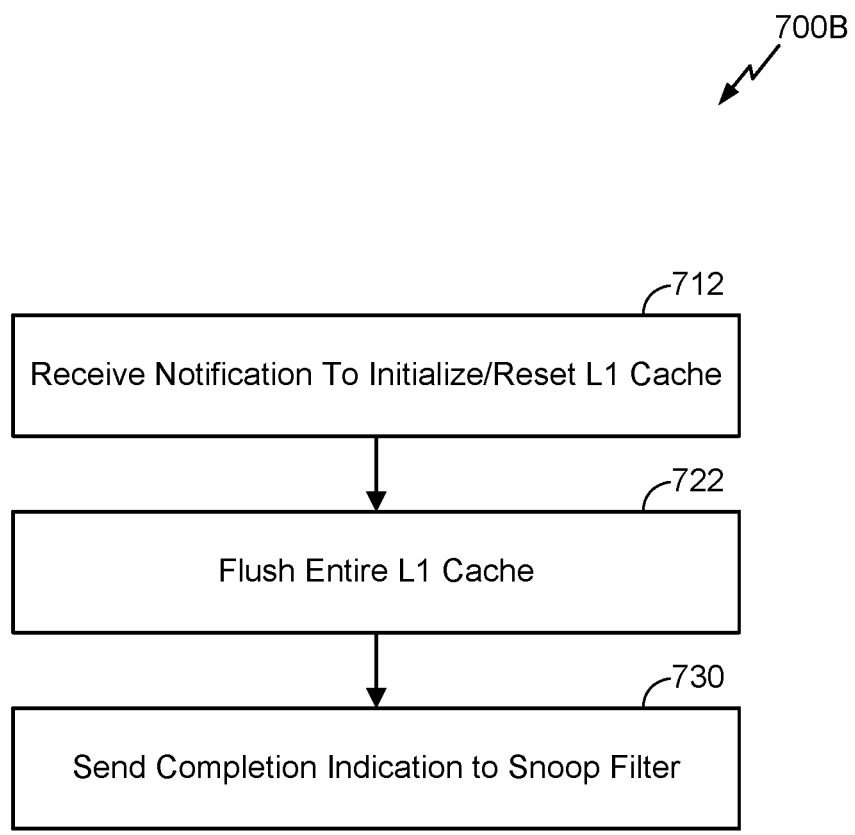
FIG. 7B illustrates another exemplary method that the local L1 cache may perform in relation to the self-healing operations performed at the coarse-grained snoop filter, according to various aspects.

According to various aspects, FIG. 7B illustrates another method 700B that the local L1 cache may perform in relation to the self-healing operations performed at the coarse-grained snoop filter upon the snoop filter reaching the limit on the ability to filter snoops. More particularly, the method 700B shown in FIG. 7B may be carried out in use cases where the snoop filter chooses to reset all caches and essentially restart filtering operations from scratch rather than choosing one or more victim entries to evict. As such, in various embodiments, the entire snoop filter may be flushed upon overflow and a notification to initialize/reset the L1 cache may be received at block 712. The entire L1 cache may then be flushed at block 722 and the L1 cache may send a completion indication to the snoop filter at block 730. If the L2 cache were inclusive of the L1 caches, the L2 cache would already have a copy of all of the data in the L1 cache(s), which would minimize the performance and power impact from flushing the L1 cache(s) because the data is still held locally in the L2 cache. In a write-through cache, a flush operation normally just causes the cache contents to be invalidated. Due to the nature of write-through, the cache does not need to move any data at the time of the flush because the cache has already been written out to a lower-level cache or memory subsystem. On the other hand, if the L1 cache has a write-back implementation, then the flush operation may cause any locally modified data to be copied to the next lower-level cache (i.e., the L2 cache). For the non-inclusive L2 cache implementation, one option could be to have the flush move the data from the write-through L1 cache to the L2 cache rather than just invalidating the L1 cache copy of the line. The L2 cache would then perform a lookup and discard the data if the lookup results in a hit because the L2 cache already has a copy. However, if the lookup results in a miss, the L2 cache could choose to install the line in the L2 cache or discard the request. The intention would be to preserve as much of the L1 cache contents in the L2 cache as may be practical at the time that the L1 cache flush occurs without unduly impacting other operations at the L2 cache or system bus. The snoop filter may resume normal filtering operations from the initialized/reset state in which all caches are empty, the snoop filter has room for new pages, and snoop filtering functions may continue without having to handle procedures to replace victim entries after overflow.

According to various aspects, the self-healing coarse-grained snoop filter described herein may be provided in, integrated into, or otherwise implemented in any suitable coherent multiprocessor system. For example, in various embodiments, coherent multiprocessor systems that can include the self-healing coarse-grained snoop filter may include, without limitation, microprocessor-based integrated circuits, mobile device processors, cellular phone processors, portable computer processors, desktop computer processors, personal digital assistant (PDA) processors, server processors, etc.

For example, according to various aspects, FIG. 8 illustrates an example multiprocessor system 800 that may implement the self-healing coarse-grained snoop filter described in further detail above. In various embodiments, the multiprocessor system 800 may include one or more processors 810 with multiple processor cores 812 that each have a local Level-1 (L1) cache 814 to rapidly access temporarily stored data. The processor(s) 810 may also have a shared Level-2 (L2) cache 816 that may include a snoop filter 818 to filter snoops to the multiple processor cores 812 that share the L2 cache 816. The processor(s) 810 can be further coupled to a system bus 820, which can intercouple various master devices and slave devices included in the multiprocessor system 800. Furthermore, as would be apparent to those skilled in the art, the processor(s) 810 may exchange address, control, and data information over the system bus 820 to communicate with these other devices. For example, the processor(s) 810 can communicate bus transaction requests to access a target location in a memory subsystem 830, which may result in the system bus 820 sending snoop traffic to the processor(s) 810 in the event that a snoop filter (not shown) implemented on the system bus 820 indicates that the accessed memory location is cached at the processor(s) 810. As such, the snoop filter 818 implemented at the L2 cache 816 may be used to perform a filtering function to determine whether to filter out the snoop and/or which processor cores 812 to which the inbound snoop should be forwarded if the snoop is not filtered out. Furthermore, the snoop filter 818 may be used to perform a similar filtering function with respect to sending local snoops when one or more processor cores 812 access a location in the memory subsystem 830 based on whether the accessed location is cached in the L1 cache 814 at another locally attached processor core 812. In various embodiments, the L2 cache 816 may typically have a write-back implementation. As such, if a snoop filter implemented on the system bus 820 were to be a coarse-grained snoop filter as described herein, then the L2 cache 816 would move at least the dirty data to the memory subsystem 830 if/when the snoop filter implemented on the system bus 820 tells the L2 cache 816 to flush a particular range. Furthermore, although not explicitly illustrated in FIG. 8, multiple system buses 820 could be provided, wherein each system bus 820 may constitute a different fabric.

According to various aspects, other devices can also be connected to the system bus 820. For example, as illustrated in FIG. 8, the devices connected to the system bus 820 can include the memory subsystem 830, one or more input devices 822, one or more output devices 824, one or more network interface devices 826, and one or more display controllers 840, as examples. The input device(s) 822 can include any type of input device, including but not limited to input keys, switches, voice processors, etc. The output device(s) 824 can include any type of output device, including but not limited to audio, video, other visual indicators, etc. The network interface device(s) 826 can be any devices configured to allow exchange of data to and from a network 880. The network 880 can be any type of network, including but not limited to a wired or wireless network, private or public network, a local area network (LAN), a wide local area network (WLAN), and the Internet. The network interface device(s) 826 can be configured to support any type of communication protocol desired. The memory subsystem 830 can include static memory 832 and/or dynamic memory 834.

According to various aspects, the processor(s) 810 may also be configured to access the display controller(s) 840 over the system bus 820 to control information sent to one or more displays 870. The display controller 840 can include a memory controller 842 and a memory 844 to store data to be sent to the display(s) 870 in response to communications with the processor(s) 810. As such, the display controller(s) 840 may send information to the display(s) 870 to be displayed via one or more video processors 860, which may process the information to be displayed into a format suitable for the display(s) 870. The display(s) 870 can include any type of display, including but not limited to a cathode ray tube (CRT), a liquid crystal display (LCD), a plasma display, etc.

Figure 9:
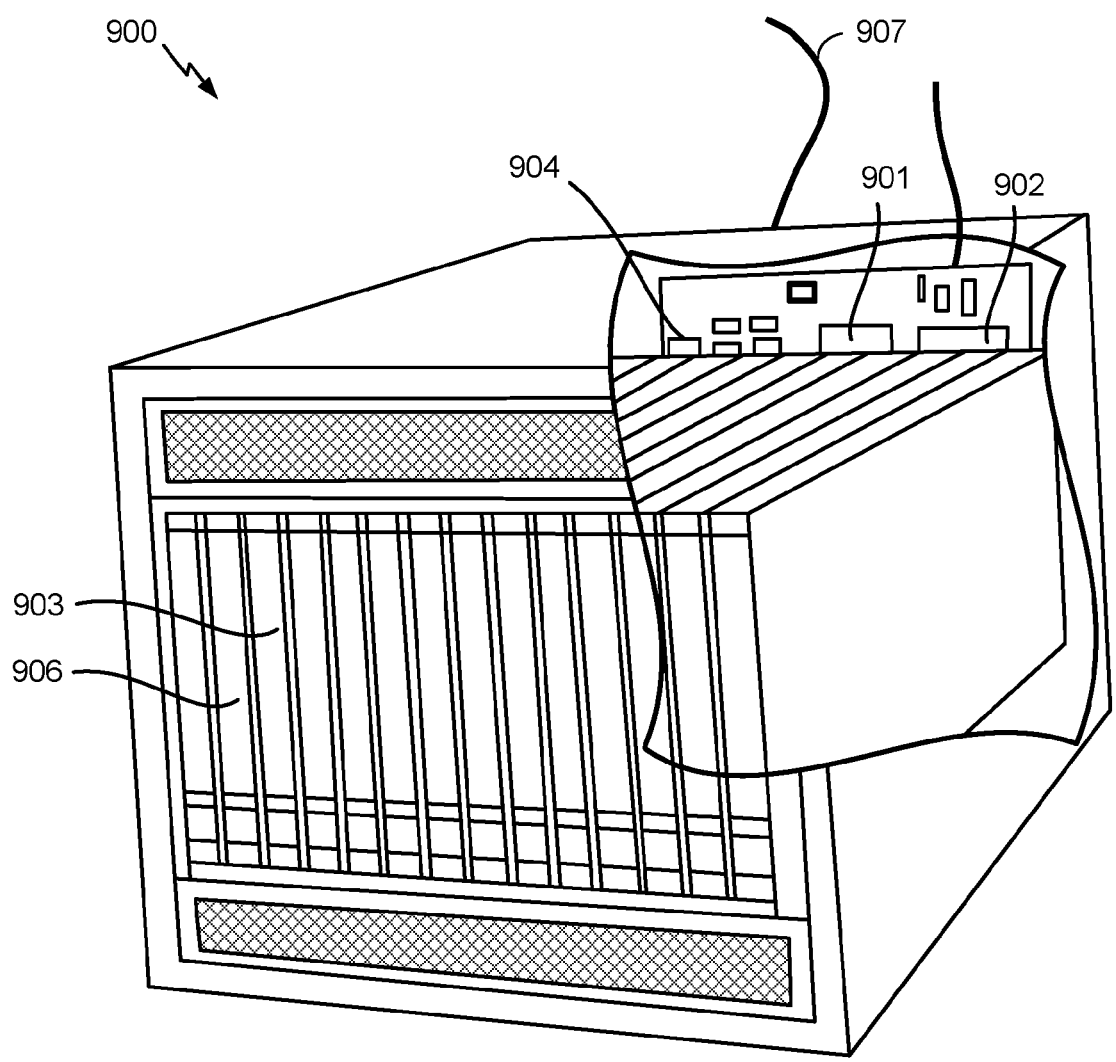
FIG. 9 illustrates an exemplary server that may implement the self-healing coarse-grained snoop filter described herein, according to various aspects.

According to various aspects, FIG. 9 illustrates an exemplary server device 900 that can be used in connection with the various aspects and embodiments described herein. For example, in various embodiments, the server device 900 may include a multiprocessor architecture that includes at least one processor 901 that has a Level-2 (L2) cache shared among multiple attached processing units (e.g., multiple processor cores). Furthermore, the shared L2 cache provided in the at least one processor 901 may have capabilities to track Level-1 (L1) cache contents at the multiple attached processing units and capabilities to filter snoops to the multiple attached processing units based thereon. As such, the server device 900 shown in FIG. 9 may generally comprise any suitable commercially available server device having such a multiprocessor architecture. As shown in FIG. 9, the server device 900 may include the at least one processor 901, which may be coupled to a volatile memory 902 and a large capacity nonvolatile memory, such as a disk drive 903. The server device 900 may also include a floppy disc drive, compact disc (CD) or DVD disc drive 906 coupled to the at least one processor 901. The server device 900 may also include network access ports 904 coupled to the at least one processor 901 to establish data connections with a network 907, such as a local area network coupled to other broadcast system computers and servers, the Internet, the public switched telephone network, and/or a cellular data network (e.g., CDMA, TDMA, GSM, PCS, 3G, 4G, LTE, etc.).

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the computer-readable medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for filtering snoops in a coherent multiprocessor system, comprising:
   receiving a request to update a target memory location at a Level-2 (L2) cache shared among multiple local processing units that each have a Level-1 (L1) cache;
   performing a lookup based on the target memory location in a snoop filter that tracks entries in each L1 cache associated with each of the multiple local processing units;
   selecting a victim entry to evict from the snoop filter in response to the lookup missing the snoop filter and the snoop filter lacking available space to store a new entry that corresponds to the target memory location;
   establishing the new entry in a temporary overflow area;
   sending a request to invalidate every cache line that maps to the selected victim entry to at least one of the multiple processing units that has one or more cache lines that map to the selected victim entry in the L1 cache associated therewith;
   receiving, from the at least one processing unit, an acknowledgement indicating that every cache line that maps to the selected victim entry has been invalidated in the L1 cache associated therewith; and
   moving the new entry from the temporary overflow area into the snoop filter to replace the selected victim entry in the snoop filter with the new entry that corresponds to the target memory location upon receiving the acknowledgement.

2. The method recited in claim 1, further comprising:
   installing the new entry in the snoop filter in response to the lookup based on the target memory location missing the snoop filter and the snoop filter having the available space to store the new entry.

3. The method recited in claim 1, further comprising:
   receiving a remote snoop after establishing the new entry in the temporary overflow area and before receiving the acknowledgement, the remote snoop indicating that a remote master has requested permission to modify a memory location; and
   forwarding the remote snoop to one or more of the multiple local processing units in response to the remote snoop hitting the selected victim entry or the new entry.

4. The method recited in claim 1, further comprising:
   temporarily disabling the snoop filter prior to receiving the acknowledgement;
   receiving a remote snoop indicating that a remote master has requested permission to modify a memory location while the snoop filter is disabled; and
   forwarding the remote snoop to the L1 cache at each local processing unit.

5. The method recited in claim 1, further comprising:
   identifying, among the multiple local processing units, at least one processing unit that has one or more cache lines that map to the target memory location in response to the lookup hitting the snoop filter;
   forwarding a local snoop to the identified at least one processing unit; and
   updating one or more metrics associated with the entries tracked in the snoop filter that are used to select the victim entry to be evicted upon the snoop filter lacking the available space to store the new entry.

6. The method recited in claim 1, wherein the selected victim entry comprises a least-frequently accessed entry selected from among a plurality of entries in the snoop filter that were least-recently accessed.

7. The method recited in claim 1, wherein the selected victim entry comprises one or more of an entry in the snoop filter that was least-recently accessed, an entry in the snoop filter that was least-recently established, or a random entry in the snoop filter.

8. The method recited in claim 1, wherein the selected victim entry comprises one or more entries in the snoop filter that the multiple local processing units have not accessed for a given time period and that remote snoops are determined to frequently hit according a ratio between accesses to the one or more entries and overall recent accesses during the given time period.

9. The method recited in claim 1, further comprising:
   flushing the snoop filter and the L1 cache at each local processing unit in response to the lookup missing the snoop filter and the snoop filter lacking the available space to store the new entry that corresponds to the target memory location, whereby the selected victim entry to evict from the snoop filter comprises every entry in the snoop filter and the request sent to each L1 cache causes the entire L1 cache to be flushed.

10. The method recited in claim 1, wherein the L2 cache is non-inclusive.

11. A coherent multiprocessor system, comprising:
   multiple local processing units that each have a Level-1 (L1) cache;
   a Level-2 (L2) cache shared among the multiple local processing units, wherein the L2 cache includes a snoop filter configured to track entries in each L1 cache associated with each of the multiple local processing units; and a processor configured to:
receive a request to update a target memory location at the L2 cache;
perform a lookup in the snoop filter based on the target memory location;
select a victim entry to evict from the snoop filter in response to the lookup missing the snoop filter and the snoop filter lacking available space to store a new entry that corresponds to the target memory location;
establish the new entry in a temporary overflow area;
send a request to invalidate every cache line that maps to the selected victim entry to at least one of the multiple processing units that has one or more cache lines that map to the selected victim entry in the L1 cache associated therewith;
receive, from the at least one processing unit, an acknowledgement indicating that every cache line that maps to the selected victim entry has been invalidated in the L1 cache associated therewith; and
move the new entry from the temporary overflow area into the snoop filter to replace the selected victim entry in the snoop filter with the new entry that corresponds to the target memory location upon receiving the acknowledgement.

12. The coherent multiprocessor system recited in claim 11, wherein the processor is further configured to install the new entry in the snoop filter in response to the lookup missing the snoop filter and the snoop filter having the available space to store the new entry.

13. The coherent multiprocessor system recited in claim 11, wherein the processor is further configured to:
receive a remote snoop after the new entry has been established in the temporary overflow area and before the acknowledgement is received, the remote snoop indicating that a remote master has requested permission to modify a memory location; and
forward the remote snoop to one or more of the multiple local processing units in response to the remote snoop hitting the selected victim entry or the new entry.

14. The coherent multiprocessor system recited in claim 11, wherein the processor is further configured to:
disable the snoop filter temporarily before the acknowledgement is received;
receive a remote snoop indicating that a remote master has requested permission to modify a memory location while the snoop filter is disabled; and
forward the remote snoop to the L1 cache at each local processing unit.

15. The coherent multiprocessor system recited in claim 11, wherein the processor is further configured to:
identify, among the multiple local processing units, at least one processing unit that has one or more cache lines that map to the target memory location in response to the lookup hitting the snoop filter;
forward a local snoop to the identified at least one processing unit; and
update one or more metrics associated with the entries tracked in the snoop filter that are used to select the victim entry to be evicted upon the snoop filter lacking the available space to store the new entry.

16. The coherent multiprocessor system recited in claim 11, wherein the selected victim entry comprises a least-frequently accessed entry selected from among a plurality of entries in the snoop filter that were least-recently accessed.

17. The coherent multiprocessor system recited in claim 11, wherein the selected victim entry comprises one or more of an entry in the snoop filter that was least-recently accessed, an entry in the snoop filter that was least-recently established, or a random entry in the snoop filter.

18. The coherent multiprocessor system recited in claim 11, wherein the selected victim entry comprises one or more entries in the snoop filter that the multiple local processing units have not accessed for a given time period and that remote snoops are determined to frequently hit according a ratio between accesses to the one or more entries and overall recent accesses during the given time period.

19. The coherent multiprocessor system recited in claim 11, wherein the processor is further configured to:
flush the snoop filter and the L1 cache at each local processing unit in response to the lookup missing the snoop filter and the snoop filter lacking the available space to store the new entry that corresponds to the target memory location, whereby the selected victim entry to evict from the snoop filter comprises every entry in the snoop filter and the request sent to each L1 cache causes the entire L1 cache to be flushed.

20. The coherent multiprocessor system recited in claim 11, wherein the L2 cache is non-inclusive.

21. An apparatus, comprising:
means for receiving a request to update a target memory location at a non-inclusive Level-2 (L2) cache shared among multiple local processing units that each have a Level-1 (L1) cache;
means for performing a lookup based on the target memory location in a snoop filter that tracks entries in each L1 cache associated with each of the multiple local processing units;
means for selecting a victim entry to evict from the snoop filter in response to the lookup missing the snoop filter and the snoop filter lacking available space to store a new entry that corresponds to the target memory location;
means for establishing the new entry in a temporary overflow area;
means for sending a request to invalidate every cache line that maps to the selected victim entry to at least one of the multiple processing units that has one or more cache lines that map to the selected victim entry in the L1 cache associated therewith;
means for receiving, from the at least one processing unit, an acknowledgement indicating that every cache line that maps to the selected victim entry has been invalidated in the L1 cache associated therewith; and
means for moving the new entry from the temporary overflow area into the snoop filter to replace the selected victim entry in the snoop filter with the new entry that corresponds to the target memory location upon receiving the acknowledgement.

22. The apparatus recited in claim 21, further comprising:
means for installing the new entry in the snoop filter in response to the lookup based on the target memory location missing the snoop filter and the snoop filter having the available space to store the new entry.

23. The apparatus recited in claim 21, further comprising:
means for receiving a remote snoop after establishing the new entry in the temporary overflow area and before receiving the acknowledgement, the remote snoop indicating that a remote master has requested permission to modify a memory location; and means for forwarding the remote snoop to one or more of the multiple local processing units in response to the remote snoop hitting the selected victim entry or the new entry.

24. The apparatus recited in claim 21, further comprising:
means for temporarily disabling the snoop filter prior to receiving the acknowledgement;
means for receiving a remote snoop indicating that a remote master has requested permission to modify a memory location while the snoop filter is disabled; and
means for forwarding the remote snoop to the L1 cache at each local processing unit.

25. The apparatus recited in claim 21, further comprising:
means for identifying, among the multiple local processing units, at least one processing unit that has one or more cache lines that map to the target memory location in response to the lookup hitting the snoop filter;
means for forwarding a local snoop to the identified at least one processing unit; and
means for updating one or more metrics associated with the entries tracked in the snoop filter that are used to select the victim entry to be evicted upon the snoop filter lacking the available space to store the new entry.

26. The apparatus recited in claim 21, further comprising:
means for flushing the snoop filter and the L1 cache at each local processing unit in response to the lookup missing the snoop filter and the snoop filter lacking the available space to store the new entry that corresponds to the target memory location, whereby the selected victim entry to evict from the snoop filter comprises every entry in the snoop filter and the request sent to each L1 cache causes the entire L1 cache to be flushed.

27. A non-transitory computer-readable medium storing computer-executable instructions, the stored computer-executable instructions configured to cause one or more processors to:
receive a request to update a target memory location at a non-inclusive Level-2 (L2) cache shared among multiple local processing units that each have a Level-1 (L1) cache;
perform a lookup based on the target memory location in a snoop filter that tracks entries in each L1 cache associated with each of the multiple local processing units;
select a victim entry to evict from the snoop filter in response to the lookup missing the snoop filter and the snoop filter lacking available space to store a new entry that corresponds to the target memory location;
establish the new entry in a temporary overflow area;
send a request to invalidate every cache line that maps to the selected victim entry to at least one of the multiple processing units that has one or more cache lines that map to the selected victim entry in the L1 cache associated therewith;
receive, from the at least one processing unit, an acknowledgement indicating that every cache line that maps to the selected victim entry has been invalidated in the L1 cache associated therewith; and
move the new entry from the temporary overflow area into the snoop filter to replace the selected victim entry in the snoop filter with the new entry that corresponds to the target memory location upon receiving the acknowledgement.

28. A method for filtering snoops in a coherent multiprocessor system, comprising:
receiving a request to update a target memory location at a Level-2 (L2) cache shared among multiple local processing units that each have a Level-1 (L1) cache;
performing a lookup based on the target memory location in a snoop filter that tracks entries in each L1 cache associated with each of the multiple local processing units;
selecting a victim entry to evict from the snoop filter in response to the lookup missing the snoop filter and the snoop filter lacking available space to store a new entry that corresponds to the target memory location;
sending a request to invalidate every cache line that maps to the selected victim entry to at least one of the multiple processing units that has one or more cache lines that map to the selected victim entry in the L1 cache associated therewith;
flushing the snoop filter and the L1 cache at each local processing unit in response to the lookup missing the snoop filter and the snoop filter lacking the available space to store the new entry that corresponds to the target memory location, whereby the selected victim entry to evict from the snoop filter comprises every entry in the snoop filter and the request sent to each L1 cache causes the entire L1 cache to be flushed; and
replacing the selected victim entry in the snoop filter with the new entry that corresponds to the target memory location.

29. The method recited in claim 28, further comprising:
temporarily disabling the snoop filter prior to receiving an acknowledgement from the at least one processing unit indicating that every cache line that maps to the selected victim entry has been invalidated in the L1 cache associated therewith;
receiving a remote snoop indicating that a remote master has requested permission to modify a memory location while the snoop filter is disabled; and
forwarding the remote snoop to the L1 cache at each local processing unit.

30. The method recited in claim 28, wherein the L2 cache is non-inclusive.

31. A coherent multiprocessor system, comprising:
multiple local processing units that each have a Level-1 (L1) cache;
a Level-2 (L2) cache shared among the multiple local processing units, wherein the L2 cache includes a snoop filter configured to track entries in each L1 cache associated with each of the multiple local processing units; and
a processor configured to:
receive a request to update a target memory location at the L2 cache;
perform a lookup in the snoop filter based on the target memory location;
select a victim entry to evict from the snoop filter in response to the lookup missing the snoop filter and the snoop filter lacking available space to store a new entry that corresponds to the target memory location;
send a request to invalidate every cache line that maps to the selected victim entry to at least one of the multiple processing units that has one or more cache lines that map to the selected victim entry in the L1 cache associated therewith;
flush the snoop filter and the L1 cache at each local processing unit in response to the lookup missing the snoop filter and the snoop filter lacking the available space to store the new entry that corresponds to the target memory location, whereby the selected victim entry to evict from the snoop filter comprises every entry in the snoop filter and the request sent to each L1 cache causes the entire L1 cache to be flushed; and replace the selected victim entry in the snoop filter with the new entry that corresponds to the target memory location.

32. The coherent multiprocessor system recited in claim 31, wherein the processor is further configured to:

disable the snoop filter temporarily until an acknowledgement is received from the at least one processing unit to indicate that every cache line that maps to the selected victim entry has been invalidated in the L1 cache associated therewith;

receive a remote snoop indicating that a remote master has requested permission to modify a memory location while the snoop filter is disabled; and forward the remote snoop to the L1 cache at each local processing unit.

33. The coherent multiprocessor system recited in claim 31, wherein the L2 cache is non-inclusive.

* * * * *